US008316078B2

(12) United States Patent
Appleton et al.

(10) Patent No.: US 8,316,078 B2
(45) Date of Patent: *Nov. 20, 2012

(54) INTER-DOMAIN COMMUNICATION SYSTEM USING REMOTE PROCEDURE CALLS FOR MESSAGE COMMUNICATIONS BETWEEN APPLICATIONS IN DIFFERENT DOMAINS

(75) Inventors: Benjamin Charles Appleton, Summer Hill (AU); Steffen Meschkat, Zurich (CH); Thai Tran, Redwood City, CA (US); Adam Sah, San Francisco, CA (US); Zheng Wang, Arncliffe (AU); Adam Paul Schuck, Kilara (AU); James Robert Macgill, Chatham, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,917

(22) Filed: Oct. 3, 2011

(65) Prior Publication Data

US 2012/0066296 A1  Mar. 15, 2012

Related U.S. Application Data

(63) Continuation of application No. 12/897,293, filed on Oct. 4, 2010, now Pat. No. 8,032,584, which is a continuation of application No. 11/754,354, filed on May 28, 2007, now Pat. No. 7,809,785.

(51) Int. Cl.
*G06F 15/16* (2006.01)
(52) U.S. Cl. .......................... 709/201; 709/219; 709/217
(58) Field of Classification Search .................. 709/201, 709/203, 207, 209, 219, 217, 218, 220, 223, 709/243, 227, 225, 240; 370/201, 352, 335; 713/201; 455/435.1
See application file for complete search history.

(56) References Cited

U.S. PATENT DOCUMENTS

| 2003/0101278 | A1* | 5/2003 | Garcia-Luna-Aceves et al. .............................. 709/240 |
| 2004/0054807 | A1* | 3/2004 | Harvey et al. ................. 709/243 |
| 2004/0153533 | A1* | 8/2004 | Lewis ........................... 709/223 |
| 2005/0027705 | A1  | 2/2005 | Sadri et al. |
| 2005/0027870 | A1* | 2/2005 | Trebes, Jr. ..................... 709/227 |
| 2005/0071469 | A1* | 3/2005 | McCollom et al. ........... 709/225 |
| 2005/0193222 | A1* | 9/2005 | Greene ......................... 713/201 |
| 2005/0222966 | A1  | 10/2005 | Sadri et al. |

(Continued)

FOREIGN PATENT DOCUMENTS

KR    2005066778 A    6/2005

(Continued)

OTHER PUBLICATIONS

Internatioal Preliminary Report on Patentability for Application No. PCT/US2008/064919, dated Dec. 10, 2009, 6 pages.

(Continued)

*Primary Examiner* — Le H Luu
(74) *Attorney, Agent, or Firm* — Marshall, Gerstein & Borun LLP

(57) ABSTRACT

A computer-implemented method for performing inter-domain communication in a web browser includes receiving first data from a first domain at a router associated with one or more domains other than the first domain, identifying at the router the one or more domains for receiving data associated with the received data, and transmitting second data associated with the received data to the one or more domains.

23 Claims, 14 Drawing Sheets

U.S. PATENT DOCUMENTS

| | | | |
|---|---|---|---|
| 2006/0010134 A1 | 1/2006 | Davis et al. | |
| 2006/0064473 A1* | 3/2006 | Borella et al. | 709/220 |
| 2006/0165040 A1* | 7/2006 | Rathod et al. | 370/335 |
| 2007/0008953 A1* | 1/2007 | Wing et al. | 370/352 |
| 2007/0101258 A1 | 5/2007 | Xu et al. | |
| 2008/0225687 A1* | 9/2008 | Oksman | 370/201 |
| 2008/0254791 A1* | 10/2008 | Oyama et al. | 455/435.1 |

FOREIGN PATENT DOCUMENTS

| | | |
|---|---|---|
| WO | WO2004090754 A1 | 10/2004 |

OTHER PUBLICATIONS

European Search Report issued in 08756328.4 on Mar. 29, 2012.

Jackson et al., "Subspace: Secure Cross-Domain Communication for Web Mashups," ACM, 2 Penn Plaza, Suite 701, New York, USA, pp. 611-619 (2007), May 8, 2007.

"XML Consortium Kansai Section, Authentication System + Web Service + Client Try with Web 2.0, " Engineer Mind, Gijutsu-Hyohron Co., Ltd., 2:5-14 (2007).

Fukatsu, "Next Stage of Ajax-RIA—Knowing Old Things and Knowing New Things," Web Site Expert, Gijutsu-Hyohron Co., Ltd., 3:148-157 (2005).

Furuhata, "Let's Realize a Site Like Web 2.0! Gist of Mashup Understandalbe at a Glance," Web Creator, MdN Corporation, 57:158-167 (2006).

Masui, "Easy Conquest with Google/Ajax/Ruby Making a Web 2.0 site by yourself," Nikkei Business Publications, Inc., 9(2):38-42 (2007).

Sugiyama, "LG3D, You Can Do This Much With Swing! Mashup & Remix with Java," Software Design, Gijutsu-Hyohron Co., Ltd., 193:22-31 (2006).

Office Action for Japanese Application No. 2010-510454, dated Jun. 26, 2012.

* cited by examiner

INTER-DOMAIN COMMUNICATION SYSTEM USING REMOTE PROCEDURE CALLS FOR MESSAGE COMMUNICATIONS BETWEEN APPLICATIONS IN DIFFERENT DOMAINS

CROSS-REFERENCE TO RELATED APPLICATIONS

This application is a continuation application of and claims priority to U.S. Application Ser. No. 12/897,293, filed on Oct. 4, 2010, now U.S. Pat. No. 8,032,584, which is a continuation of and claims priority to U.S. Application Ser. No. 11/754,354, filed on May 28, 2007, now U.S. Pat. No. 7,809,785, the contents of which are incorporated herein by reference.

TECHNICAL FIELD

This document discusses mechanisms and techniques for communicating between in a web page, such as iframes associated with different domains.

BACKGROUND

Many searches made by internet users involve some geographic components. The search itself may include geographic information, such as an address for which a map and driving directions are sought. The search may also implicitly call for geographic results, such as when the search includes the name of a business having a physical location. Such searches may be received by, and/or the results delivered by, an information provider service such as Google Maps.

Application programming interfaces (APIs) may permit third parties to extend the functionality of a geographic information provider service. For example, using an API, programmers have taken data from apartment and house listings and have created applications that show those listings on a map such as with Google Maps (e.g., http://www.housing-maps.com/).

SUMMARY

This document describes mechanisms and techniques that may be employed to provide for interaction with web applications that may involve components from different domains, such as the provision of interactive maps from a service such as Google Maps. For example, portable program modules in the form of gadgets may be integrated with a main web application page and may communicate with the main page where the gadgets are hosted from one domain and the main application is hosted from a different domain. The communication may occur even though a web browser may take efforts to limit inter-domain communication.

In one implementation, a computer-implemented method for performing inter-domain communication in a web browser is disclosed. The method includes receiving first data from a first domain at a router associated with one or more domains other than the first domain, identifying at the router the one or more domains for receiving data associated with the received data, and transmitting second data associated with the received data to the one or more domains. The second data may include the first data, and the second data can be transmitted from the router to the one or more domains. In addition, the first domain and the one or more domains other than the first domain may each be defined by a frame, and the router can be defined by a frame. The frames can comprise iframe elements.

In one aspect, the one or more domains can each implement portable program modules, such as gadgets. The method may also include receiving at the router third data from one of the one or more domains, and providing the third data to the first domain. In addition, the method can include providing the third data to at least some of the one or more domains. The method can also include transmitting the first data the router associated with the one or more domains other than the first domain, from a router associated with the first domain. In addition, the method an include receiving multiple groups of data at the router associated with the first domain and combining the multiple groups of data into a single packet before transmitting the multiple groups of data to the router associated with the one or more domains. The method can also include ordering the multiple groups of data before transmitting the packet.

In another implementation, a computer-implemented system is disclosed. The system comprises a first application displayed on a web page and operating in a first domain associated with a web application, one or more other applications displayed on the web page and operating in one or more other domain associated with the web application, and a first relay corresponding to the first application operable to receive data from the first application and distribute the received data for receipt by the one or more other applications. The system can also include a second relay corresponding to the one or more other applications, to receive data from the first relay and distribute the data to the one or more application. The first relay can be configured to receive data from the second relay and provide the received data to the first application.

In one aspect, the first application and the one or more other applications are configured to be displayed on a common web page. Also, the first relay can package multiple data groups into a single package before transmitting the single package to the second relay. The system can also include a plurality of frames, wherein a frame of the plurality of frames defines a display of the first applications, and the other frames of the plurality of frames define displays of the one or more other applications. The first application may comprise a maps application, and the one or more other applications may comprise gadgets.

In yet another implementation, a computer-implemented system is disclosed. The system includes a first application displayed on a web page and operating in a first domain associated with a web application, one or more other applications displayed on the web page and operating in one or more other domain associated with the web application, and means for communicating data between the first application and the one or more other applications.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
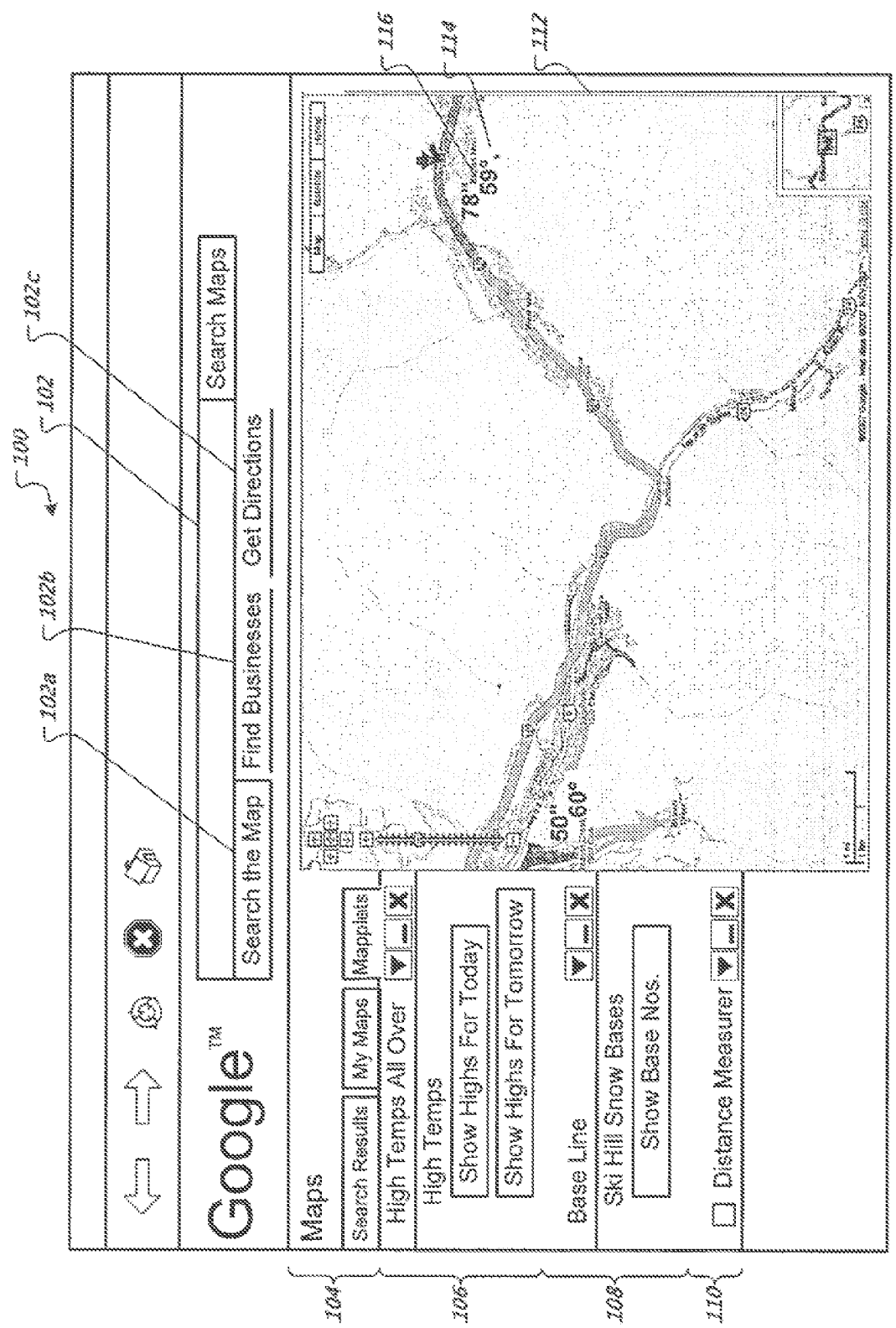
FIG. 1A is an example display of a mapping application interacting with two portable program modules.

FIG. 1A is an example display 100 of a mapping application interacting with two portable program modules. In general, the display 100 shows a combination of forecast high temperatures and snow bases for a variety of ski hills. In the example, one third party has developed a gadget, referred to here as a "mapplet" because it interacts with a mapping application, that accesses public weather data to show a forecast map. Another third party has developed a mapplet that accesses snow base information from other public sources. In the example, in the absence of such an integrated display, a user may have been required to operate the two applications separately to, for example, identify multiple lodges having good bases, then memorize those lodges, and search for temperatures at those lodges. In the example, in contrast, each piece of information, which may have been provided by mash ups that access a mapping application such as Google Maps, is provided in a combined manner. In addition, the combined information is displayed on, and thus managed by, the maps page itself.

In certain implementations, such an approach may have one or more of the following advantages. Various modules may be associated with a mapping application and may be accessed by users who visit a web page associated with the mapping application. Such users may search for modules and select the modules that address their particular needs, much like users of the Google Personalized Home Page, or iGoogle, can identify general modules for use on a personalized page. The mapping modules may also be incorporated into a personalized home page, along with other modules that do not relate to maps. In addition, such mapping modules may be provided automatically as results to search queries, where selection of a control shown in a search result causes a map to be displayed that includes data relevant to the search result.

Moreover, such modules may include transaction-processing capabilities. For example, a search for hotels may produce a search result directed to a module for displaying relevant hotel search results on a map. Selection of a particular hotel on the map may cause information about the hotel (e.g., room rates and availability) to be passed to the module, so that a user may book a room through the module.

The output of multiple modules may also be combined on a single map in various manners selected by a user. In this manner, users may combine multiple sets of data that are important to them in a single graphical representation. Such combinations may draw upon various source of geographically related content, such as business search, driving directions, a personal address book, KML (Keyhole Markup Language) files, transit information, and other such information sources. Such a combination may be referred to as a mash up of mash-ups.

Referring to FIG. 1A, display 100 shows a mash-up of mash-ups, in the form of two portable program modules 106, 108 implemented as gadgets or mapplets, that affect the display of a map 112 from a mapping application. Display 100 may be controlled broadly by a search control 102 into which a user may enter geographically-related search queries. A "search the map" tab 102a is shown as selected for the control 102, so that search queries will be applied to a corpus of general geographic location information. A "find businesses" tab 102b may also be selected, in which case submitted queries will be matched to a corpus of business names, and results will comprise particular locations for matching business on the map 112. A "get directions" tab 102c, when selected, causes directions to be generated in a familiar manner from one location to another, such as from a default location stored in a user profile to the entered location.

A mapping control area includes a tabs area 104, a module 106 in the form of a "hi temps" mapplet, a module 108 in the form of a "base line" mapplet, and a collapsed module 110 in the form of a "distance measurer" gadget. The tabs area 104 includes a search results tab that, when selected, causes the display of geographic results to a search query. In addition, the tabs area 104 includes a MyMaps tab that, when selected, causes a number of user-associated maps to be displayed. For example, a user may have a map that shows an area around his or her home town. In addition, the user may have saved a map that shows all White Castle restaurants in an area, where a text entry box (not shown) may be provided to receive a zip code or other similar information for identifying the proper area (or the area may be received from information entered in search control 102). The MyMaps display may result in the display of maps along with mapplets that have been associated with those maps by the user.

A mapplets tab is shown as being currently selected in tabs area 104. The mapplets tab presents a frame that may contain one or more iframes implementing portable program modules, such as in the form of mapplets. Module 106 is an expanded module that accesses a database of weather information that contains forecast high temperatures throughout an area of interest, such as throughout the United States. The temperatures are geo-correlated, and thus may be displayed on a map such as map 112. Two controls are shown that have been generated by module 106, and their selection may cause temperatures to be retrieved for the current day or the next day. Selection of the controls may, as described in more detail below, cause temperature data to be retrieved form a data source, and then submitted to a map server that generates code for map 112.

Module 108 shows a "base line" gadget, which obtains information about the "base" thickness of snow at various ski resorts. The module 108 then passes the information to an engine associated with map 112 so that the base information is plotted on map 112 at appropriate geographic locations. In addition, module 110 is shown in a compressed form, and may be expanded if and when a user wants to use the module. Module 110 is termed a "distance measurer" and, when invoked, may interact with map 112 so as to sense a user's selection of points on map 112, and then may compute a distance between two selected points. Other modules may also be provided, and may be accessed by a user from a central clearinghouse of modules, much like users can access general gadgets from iGoogle.

Map 112 shows the results generated by the use of the other pictured components. Map 112 includes a standard map that is positioned and sized according to user selections, such as being centered on a zip code entered in search control 102 by the user. Overlaid as part of map 112 are temperature 114 and base indicator 116. Temperature 114 may be one of multiple different geo-correlated temperatures passed to a mapping application, such as maps.google.com, by module 106. Likewise, base indicator 116 may be one of multiple different geo-correlated indicators passed to the mapping application by module 108. By having the mapping application respond in concert to submissions from both module 106 and module 108, a user may be presented with two different pieces of information that may not have been otherwise available in a single convenient display.

Figure 1B:
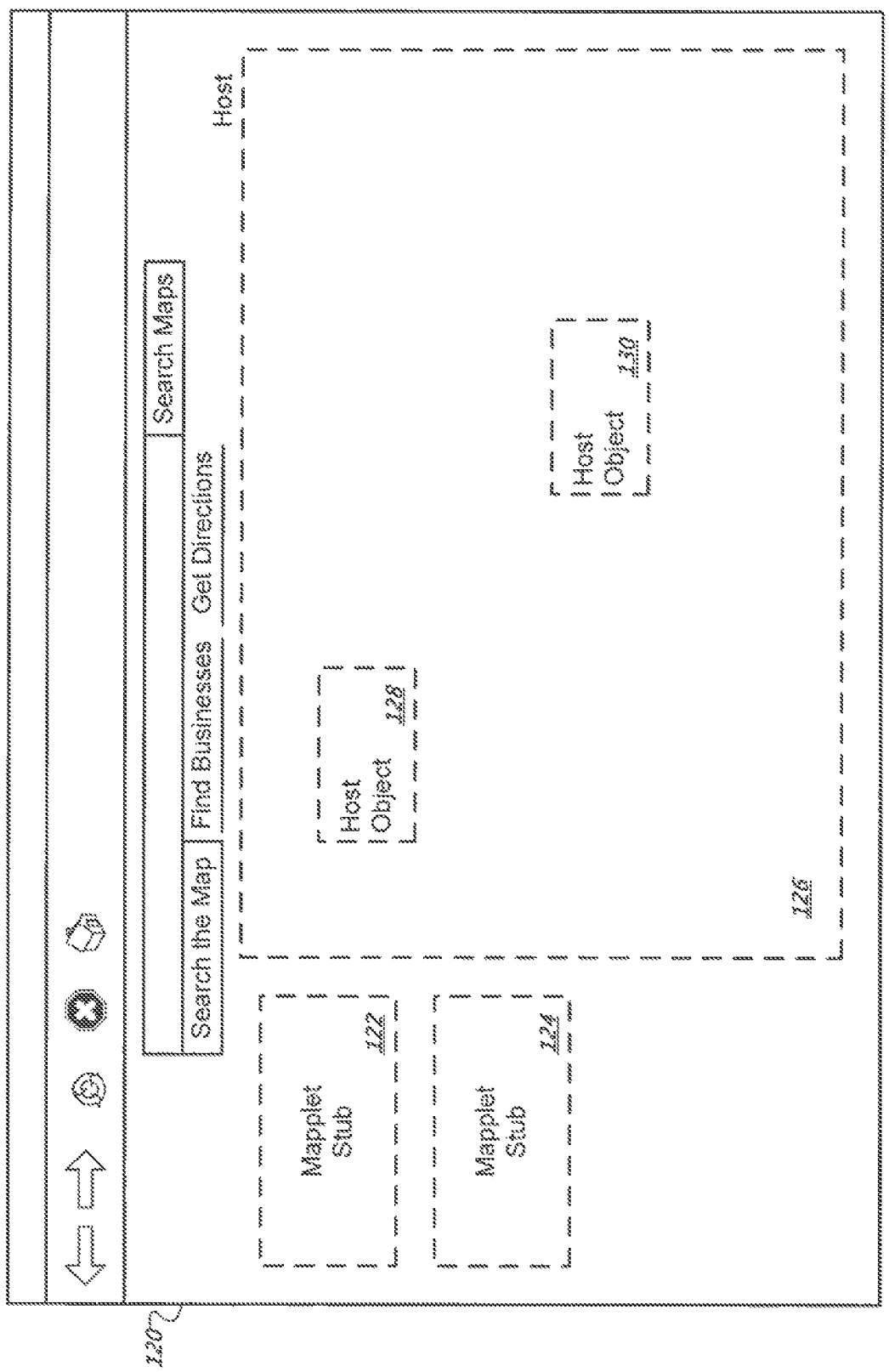
FIG. 1B shows items from the display of FIG. 1A.

FIG. 1B shows items from the display of FIG. 1A, as generic objects that underlay the actual display in FIG. 1A. Various elements for a particular implementation of a web page showing modules and map outputs are shown here for clarity, but selection of particular elements is not meant to be limiting. The modules are implemented as code, referenced here as a mapplet stub, inside an iframe embedded in a maps HTML page 120. For example, mapplets stub 122 may represent code for implementing the control 106 in FIG. 1A. Likewise, mapplets stub 123 may represent code for implementing the control 108 in FIG. 1A. The HTML document inside the iframe that is used to host the mapplet is referred to as the mapplet page, and can include, for example, HTML, CSS, and script code. The mapplets stub 122, 123 may also include a mapplets API (and associated library) for communicating with a server running an application for generating map 120.

Each mapplet, which is a particular form of a portable program module (i.e., a program that performs a defined function and can be inserted in a variety of environments, such as in various iframes on various web pages) may include meta data properties, user preferences with default values, HTML text, and script code. The script allows the mapplet to implement behavior and functionality. The code runs in an iframe that is hosted on a domain that differs from the domain for the maps application, and communicates with the maps application using cross-frame or inter-domain calls. Such separation of the code by frames imposes certain levels of security, because the mapplet code is restricted from manipulating the map to the extent of a provided API, rather than to the full extent of the DOM API. Such restrictions are generally imposed by the browser that is executing the code.

The mapplet code may also be given access to external data feeds, as explained in more detail below. An HTTP proxy service may provide such access, and the proxy may in certain circumstances cache the data or execute transactions with a backend. Standard mechanisms of implementing a proxy in this situation may be used. In certain implementations, the mapplet code may also have access to user-specific data, such as a user's address book stored on a local client or at a central database. Security for accessing such information may also be provided, such as by requiring a bearer token that is only granted after a user has explicitly provided for such access to a service. Such an implementation could permit, for example, the automatic or semi-automatic accessing of address information in generating driving directions on a map (e.g., from a user's address to the home of a friend). In addition, the mapplet code may access other outside data providers such as the Google Base data store.

The portion of the HTML page 120 that runs outside the iframes is known as the mapplet host 126. Objects that live in the maps application in this area are known as host objects, and their proxies in the mapplet stub may be known as stub proxies. Host objects may be generated from information provided by a mapplet stub, and may have behavior that may be tracked by a mapplet stub. In the figure, for example, host objects 128, 130 may each represent temperatures with geo-correlating information that were supplied to the host 126 by mapplet stub 122. The stub and host functionalities may be support by appropriately provisioned libraries.

In certain implementations, such as when mapplet code is from a trusted source, the mapplet code may be executed from the same domain as the mapping application itself. Such implementations may permit for faster, synchronous, and more efficient operation. Interaction with the mapping application in such implementations may occur via a standard API for the mapping application, such as the Google Maps API.

Figure 2:
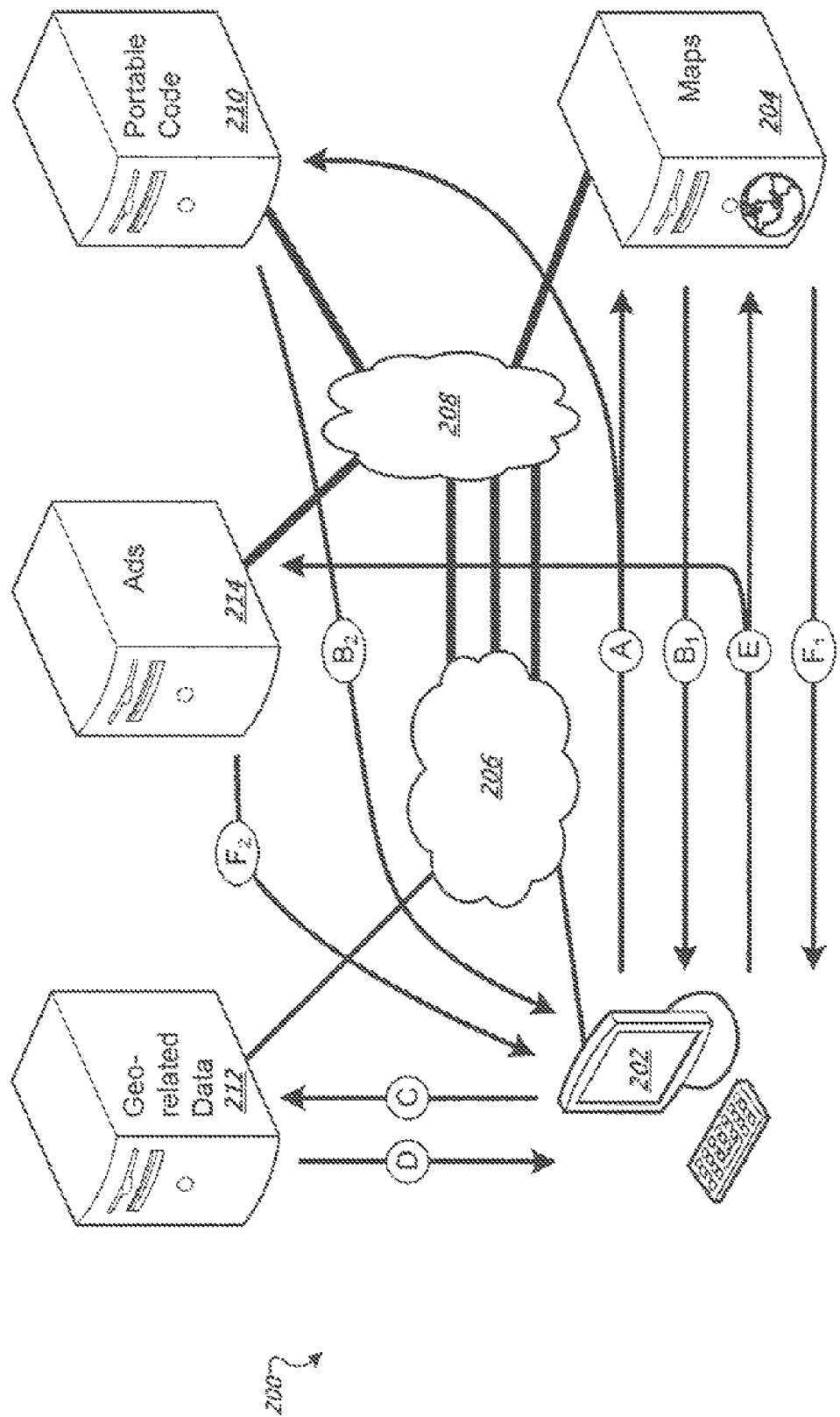
FIG. 2 shows a conceptual diagram of a system and process for coordinating a mapping application with two portable program modules.

FIG. 2 shows a conceptual diagram of a system 200 and process for coordinating a mapping application with two portable program modules. In the pictured example, the system 100 comprises a client device 202, and a number of servers 204, 210, 212, and 214 providing data for the operation of the client device 202 In general, the system 200 is configured to provide functionality like that demonstrated in FIG. 1A, with the use of portable program modules (e.g., gadgets/mapplets) to interact with a mapping application. As a result, a user of client device 202 may choose certain modules for providing custom results associated with a map, and may then see data formatted for display on the map or multiple maps.

The client device 202 may be provided with a web browser or other internet-related application. The web browser may execute mark-up code and other similar code such as JavaScript code that it obtains from various servers to which it may make requests. For example, the portable code server 210 may provide mark-up code for the browser, including code for modules associated with a user of the client device 202. For example, the user may have an account associated with the portable code server 204, and may be identified (e.g., via server-side information or via client-side information such as a cookie) by the code server 204, and be provided with a list of MyMaps that the user has previously configured. They may then select one of the maps, and may have code associated with the map delivered for execution on their browser.

For example, mark-up code may be delivered that may include various forms of HTML code, such as code for generating a portable program module (e.g., mapplet) on a display of the client device 202. The portable program module may be part of an iframe on a web page represented by a container document. In general, an iframe is an HTML document that may be embedded in another HTML document, using an iframe element. The document in which the iframe is embedded, the container document in this example, may be generated around the iframe while the iframe itself is still being generated. The code for the container document and for the iframe may be provided by portable code server 210 or from other sources.

Example HTML code for providing an iframe in a web page includes the following:

```
<html>...
    <iframe src="http://portablecode.com" height="100"
    width="200" frameborder="0" scrolling="no">
    </iframe>
    ....
</html>
```

As this code shows, the iframe element may reference a document to be inserted in the iframe, dimensions for the iframe, and whether scrolling should be allowed inside the iframe. The document in the iframe can be replaced with another document or can be modified or refreshed without refreshing the container document (e.g., the surrounding page), by using the "target" attribute of an HTML anchor or by using JavaScript, such as in an AJAX implementation. Similar displays may be generated, for example, through editing of a document's DOM tree.

The portable program modules obtained by the client device 202 may communicate with the container document, with the portable code server, and with the other servers 204, 212, and 214. The maps server 204 receives requests from the client device 202 and provides graphical geographic information, generally in the form of maps, which may be 2D maps, 3D maps, or other forms of maps. In addition, maps server 204 may receive geo-related data from client device 202 or from other sources, and may correlate the information with locations on a map, and return the information in a manner so that the client device 202 may display the data over the map. The communications between code executing on the client device 202 (e.g., as provided by the portable code server 210) and the maps server 204 may occur according to a published application programming interface (API), as explained in more detail below.

The ads server 214 may also receive requests from code operating on the client device 202, and may generate ads targeted to the requests. For example, requests for information in a particular area, in addition to generating a map for that area, may cause ads server 214 to generate ads associated with the area. The ads may also be targeted to more than just the geography of a request. For instance, if a request is for "doughnuts 02128," the ads may be targeted to concepts like "doughnut," "breakfast," or "food," and the geography may be targeted to the Boston area.

The generated ads may be presented as text ads around the edge of a screen, or may be incorporated into a map presented to a user. Where the ads are presented in a map, the results may be sent by the ads server 214 to the maps server 204 or directly to the client 202 in an appropriate format. As a result, the logos of various Dunkin Donuts shops may be shown on the map as part of a search result, if Dunkin Donuts has chosen to advertise through the system.

The ads server 214, portable code server 210, and maps server 204 are shown in FIG. 2 as attached to a common network 208, which is separate from a central network 206, such as the internet. The network 208 may indicate that servers 204, 210, and 214 are operated by a single information provider, such as Google. Though shown as separate, individual servers for clarity, the various services discussed here may be provided in a variety of manners, though mapping services will generally be provided by a sub-system that is separate from ads services, for efficiency reasons, and serving of portable code may be provided on a domain that is separate from the domain for map services, both for efficiency and security purposes (e.g., so that portable program modules submitted by third parties cannot easily affect the mapping application other than through a standard API).

The portable code server 210 is shown to serve code from the same organization as are ads and maps. However, in various implementations, client device 202 may obtain code, and particularly code for portable program modules, from third party suppliers. In such situations, maps information may be received from maps server 204, and code that is part of a user's web page may point to other locations (e.g., using the iframe definition demonstrated above) for code to be executed in the portable program modules. The system 200 may also be implemented to permit use of portable program module code only from the organization that supplies the mapping application (even if it is from a different domain) so that the integrity of the code may be mode easily verified and maintained.

Lettered arrows in FIG. 2 show an example of an set of operations performed by the components in system 200. As shown by arrow A, the client device 202 initially requests a web page (e.g., by a user selecting a MyMaps link) from the maps server 204, such as by directing an HTTP request to maps.google.com. The target organization (in this example, Google, Inc.) may provide the request to a maps server and to one or more other servers. For example, the organization may identify the user of client device 202 as a registered member of the organization, such as by querying a cookie stored on client device 202 or matching a session ID to a logged in user. The organization may then route the user's request to portable code server 210, which may determine that the user has one or more portable program modules associated with their personalized map page or personalized web page. The maps server 204 may also initially deliver code for a main page, and that code may reference the portable code server 210, such as in the definitions of iframes on the page. The servers 204, 210 may then deliver map page code and portable program modules code that is referenced by iframes in the map page code, as shown by Arrows B1 (for maps data) and B2 (for portable program modules code).

The client device 202 may then display the map page, which may include default values displayed on the map, such as by displaying a blank map centered on a "home" location associated with the user. The portable program modules may pass initialization values to the main map page, such as by inter-domain communications discussed below. The portable program modules on the map page may then be manipulated by the user to identify data to be gathered for display on the map. For example, in a real estate module, the user may select types of homes to display (e.g., attached or single family) and may also select a price range, such as from drop down boxes. After selecting the appropriate parameters, the user may select to submit the parameters, which may cause a request to be generated by the code in the relevant portable program modules, where the request is directed to geo-related data server 212 (arrow C). The geo-related data server 212 may contains all sorts of data, and may be particularly relevant when the data is associated with a geographical identifier. For example, where real estate listings are sought, the addresses of homes in a database may represent geo-related information for the listings.

The data relating to the listings may then be returned to the module that requested it (arrow D) and may then be submitted to maps server 204 for interpretation and addition to the map displayed to the user (arrow E). The data may, in certain implementations, also be provided directly from the geo-related data server 212 to the maps server 204 or a similar server, without passing through the portable program module on the client device 202.

When received at the maps server 204, the information may not be appropriately geocoded. For example, the information may be formatted to describe street addresses. The maps server 204 may thus initially convert the received information into geocoded information, such as by converting street addresses to lat/long pairs. The geocoded information may then be located relative to the map, and each piece of information may be formatted accordingly. The information may then be passed to the client device 202 for display with, and overlaid on, the maps (arrow F1.)

In certain implementations, targeted ads may also be provided by the system 200. Those ads may be selected based on words or concepts contained in the geo-related data, which may be initially sent to the ads server 214, along with an indication of the geographic area to be displayed to a user on the map. The ads server 214 may then select appropriate ads directed to the particular concept and the geographic area, and may serve those ads, including by serving them with geocoded data so that the ads may be placed on the map at appropriate locations. For example, the ads server 214 may identify a particular chain of restaurant as being relevant to a user, may convert addresses of various ones of the restaurant chain to a geo-coded format (e.g., lat/long), and may deliver the ads directly to the client device 202 or indirectly through the maps server 204, so that the ads are formatted to be received by the client device 202 and displayed on the map.

Keywords for selecting ads may also be associated with the particular module making a call for information. For example, a module may be programmed so as to include a particular keyword with a request, so that the keyword may be used to selected targeted ads. For example, the example module for viewing houses for sale may include with its submission a term such as "housing," so that ads for building supplies and remodeling services may be served to a user. Also, keywords for a module may be stored at a server, such as ads server 214, so that an identifier for the particular module need merely be provided to the ads server, and the ads server may then look up the corresponding term(s) for that module.

The gathering of information from the container document on the client device, the submission of that information to the maps server 204 and geo-related data server 212, and the serving of ads, may all occur, in appropriate implementations, at least in part while the page associated with the container document is being loaded. As such, the display created by the portable program module, such as particular map showing data associated with a portable program module, may be viewable by a user almost immediately upon accessing and loading the associated web page.

The portable program modules may also be provided with additional functionality for accessing information for display with the web page on client device 202. For example, calls made by the portable program modules may be conditional or iterative. As one example of conditional calls, requests may be submitted to geo-related data server 212 only if controls generated by the module have been set in a particular manner. It should be appreciated that various functions provided by a language such as JavaScript and JavaFX may also be implemented by the portable program module, thus enabling a rich array of interactions.

The displays produced by the portable program modules may include metadata, such as hyperlinks, that permit a user to interact with the results. For example, text displaying certain information on a map may be associated with a hyperlink whose selection leads the user to a web page associated with the item. In addition, "floating over" an item provided over a map may result in the display of additional information relating to the item, in a conventional manner.

Figure 3:
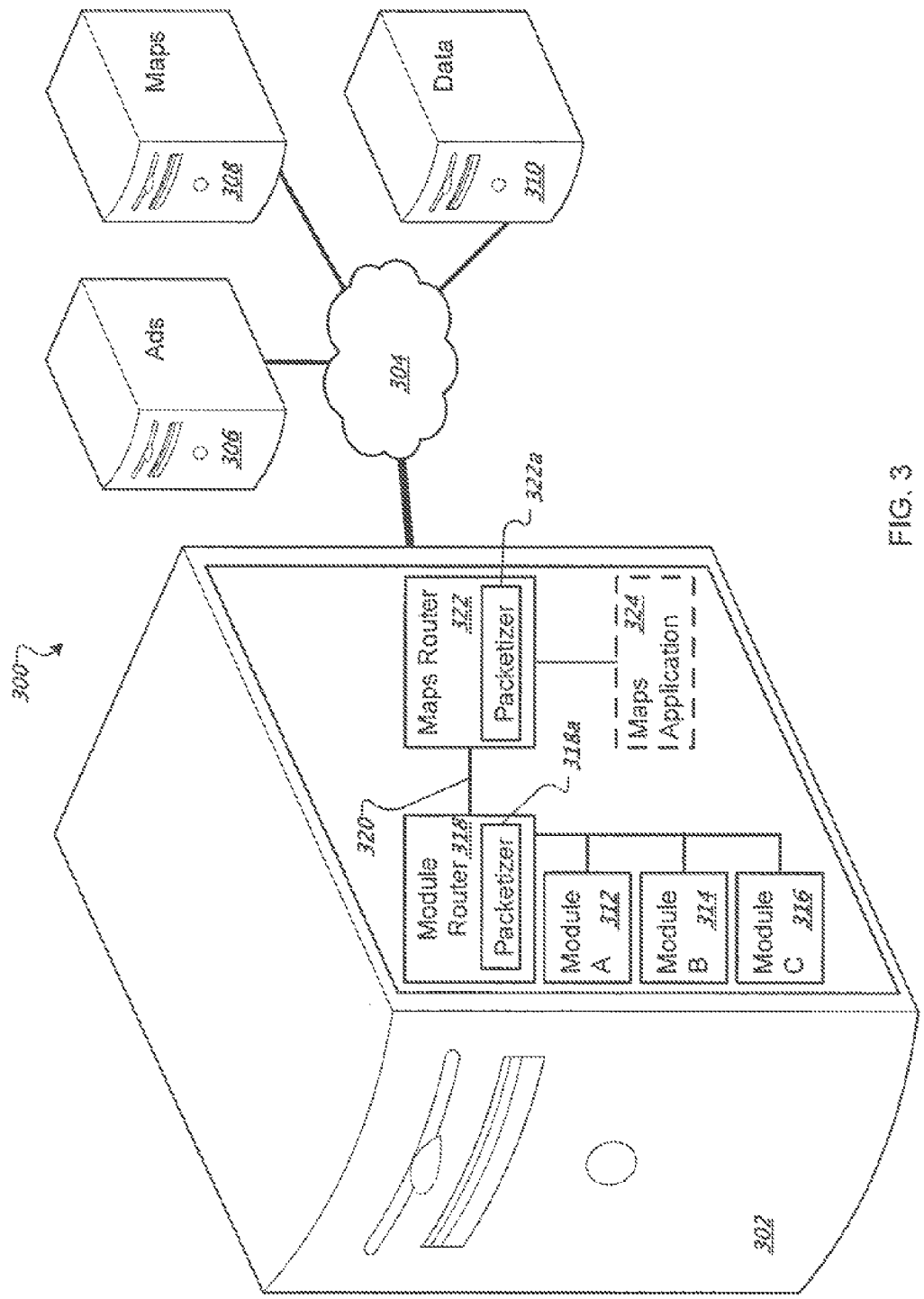
FIG. 3 is a schematic diagram of an example system for integrating portable program modules with a mapping system.

FIG. 3 is a schematic diagram of an example system 300 for integrating portable program modules with a mapping system. In general, the system 300 includes a client device 302 that communicates through network 304, such as the internet, with a number of servers that provide data for the generation of a map on the client device 302. Shown in more detail are particular structures on the client device 302 that are parts of different domains associated with portions of a web page generated by a web browser. The illustrated example shows an arrangement for permitting communication between the various domains on the browser. Generally, such communication is discouraged and difficult, because browsers include various feature to prevent inter-domain communication that may be used by one piece of software to invade or take over other pieces of software.

Referring to FIG. 3, the client device 302 may submit requests to data server 310 to obtain data that is amenable to mapping applications, such as data associated with information from which a lat/long location can be inferred. In addition, the client device 302 may submit requests to the maps server 308, and requests from the client device 302 may also be routed to the ads server 306, in ways like those shown for FIG. 2.

Shown conceptually in client device 302 are a number of software components for generating a mapping-related web page. The components are various portions of the page, or portions of code for implementing the page. The components are implemented in the example in such a manner so as to permit inter-domain communication between a component that is generating the container document, and the components that include portable program modules displayed with the container document. In this particular example, the container document is a maps page such as www.google.com, whereas the portable program modules are gadgets, known here as mapplets, that are generated on the maps page and interact with the displayed map.

In general, the communication occurs through the use of invisible iframes that serve as relays for information sent from the application to one or more of the modules, and vice-versa. Each solid box in client device 302 represents an iframe on a main maps page, whereas the dashed box represents a state of the maps application 324. Communications between modules generally use remote procedure calls (RPCs) having ephemeral connections, where a request that expects a response supplies the details (e.g., source iframe, relay url to use) by which is expects to receive the response.

A maps router 322 manages communication with the maps application 324, and a module router 318 manages communication with the various modules. The main window creates one iframe for each router. One router iframe is associated with each domain of the iframes on the page which are to communicate with each other. Each router iframe is assigned a name and ID, and its src attribute is set to the location of the router html file on the host for which that router acts. The ID is an identifier by which the router can be located, and is, in the example, derived uniquely form the router's hostname. For example, a mapplet host on the domain gmodules.com may take an iframe in a manner such as:

```
<iframe id="gmodules.com"
    name="gmodules.com"
```

```
            src="http://gmodules.com/router.html>
            </iframe>
```

The routers may be created through DOM manipulation, by delaying their insertion into the page until it is known that they will be needed (e.g., when a user selects the "mapplets" tab). The creation of the routers is also generally asynchronous, in that the creation of each router is generally independent of the creation of other routers. As a result, the various processes creating routers may, in certain instances, enter a race condition, in that one router may be ready to communicate before another router. To help coordinate router interactions, the main page creates a router for each domain, attaches onload handlers (JavaScript functions) to observe when each router has loaded, and waits until all routers have completed loading before loading the mapplets iframes.

With the routers created, each iframe then registers itself with a router so that the router can forward packets to the iframe properly. When the main pages creates a mapplets iframe (or another frame that may seek to use the communication system), it locates the router corresponding to that domain and registers the ID of the mapplet iframe with each router that will communicate with that mapplet iframe. In doing so, it may (1) compute the hostname of the mapplet iframe from the src of that iframe, (2) form a unique router/id name, (3) locate that router by calling "window.top.frames [nameOfRouter]", (4) registering the mapplet iframe by calling "router.registerIframe(iframeID, relayUrl)." In this example, iframeID is the ID of the mapplet iframe, and relayUrl is the url of the relay iframe for the domain of the mapplet. The relay iframe is the mechanism by which data packets are sent from other iframes to that target mapplet iframe, via the router for that mapplet's domain.

Each router 318, 322 may be provided with an associated packetizer 318a, 322a, respectively, to merge small packets that are sent to a common domain and split the packets at the target router. The packets may include data groups from requests by various iframes, and need not take any particular form. The routers 318, 322 receive packets as they arrive, either from the associated maps application 324 or from one or more of the associated mapplets 312-316. The received packets may include groups of data from or for multiple sources. For example, module router 318 may receive data from modules 312-316, and maps router 322 may receive data for the modules 312-316 from the maps application. Such multiple packet situations may be common in particular implementations. For example, code for creating a marker on a map and for adding it to the map may require one packet to make the marker and another to add it to the map. In such an implementation, adding ten markers to the map (e.g., to represent ten search results) would require twenty packets. As another example, it may be common for the modules to listen for map events such as an end of movement event, at the same time. In such a situation, packets sent by the map will be merged by the maps router 322 and broadcast to the modules 312-316 by the modules router 318.

For transmissions from the maps router 322 to the modules router 318, the packetizer 322a combines the received packets and the router 322 sends them across the domain boundary. A serialized command to create a marker may look like:
    101&-33.86,151.20&http://some.domain.com/marker.png
In this example, 101 is the id of a method "create a new marker", -33.86,151.20 is a serialized latitude/longitude pair indicating the location of the marker, and http:// . . . /marker.png is the icon to use when rendering that marker.

Adding that marker to the map would then be another serialized command, like:
    15&1&17
Here, 15 is the id of a method "add an overlay to the map", 1 is the id of the map to which the overlay should be added, and 17 is the id of the marker that should be added to the map.

Creating a second marker (with id 18) and adding it to the same map (with id 1) would then involve two more serialized commands
    101&33.87,153.05&http://some.domain.com/marker2.png
and
    15&1&18
For efficiency, the packetizer may observe that these 4 commands are going to a single domain in quick succession. As a result, it may form a single packet, like:
    101&33.86,151.20&http://some.domain.com/marker.png;15&1&17;101&33.87,153.05&http://some.domain.com/marker2.png;15&1&18
The example uses a semi-colon to delimit the individual commands in a packet; in practice, any invertible scheme for concatenating commands may be used to form packets. In general, the particular format of the packets may take any appropriate form; the particular form shown here is for illustrative purposes.

The packetizer is configured to wait before sending a group of packets according to a predetermined acceptable latency for the transmissions, and for an acceptable packet size. For example, Internet Explorer limits packets to 4096 bytes on the url+hash fragment, and about 2048 bytes for the GET url. The router may keep track of elapsed time since the first currently-stored packet arrived, and of the size of the currently stored group of packets, and may trigger the sending of a group of packets when a predetermined value is exceeded in either parameter.

The router may also, in certain implementations, ensure that message ordering is preserved, e.g., so that a request to create a marker is processed before a request to add the marker to a map. The invisible relay iframes (used to send packets between routers) may be inserted into the body of the html document using the JavaScript DOM, calling document-.body.appendChild, and may be used to enforce ordering. Also, ordering may be preserved in browsers that permit permutation of packet order (by permitting the permutation of the order in which iframes are loaded) by explicitly tagging each packet with a counter, and at the receiver, reordering the packets in increasing order of counter.

For their operation, the iframes may rely on libraries defining proper action of the iframes. For example, the routers may rely on a router library that handles communications between domains, including acknowledgements, merging and splitting of large and small packets, and other similar tasks. The other iframes may rely on a client library that defines an API and stores context such as callbacks and service handlers.

The client library may provide various services, including a call service, a register service, and an initialize service. The call service sends a message to another iframe via the router. A call request may include parameters for a target iframe ID, a service ID for the service to call (e.g., adding an overlay (e.g., Marker) to a map; opening an infowindow at a point on the map; the map reporting an event such as a mouse click to a mapplet; and more advanced services such as geocoding (converting an address string to a latitude and longitude), and requesting driving directions between two or more points on a map.), any arguments that are required by the service, and an indicator of whether a callback on reply should occur.

One example of a JavaScript call in a mapplets API is:
map.getCenterAsync( );
This requests that the map return the latitude and longitude of the center of the current viewport (viewed area on the map). This call is made by a mapplet iframe to the main page containing the map. The serialized command corresponding to this call may look like
4&1&callback5
In this example, 4 is id of the service "get the current center of the map", 1 is the id of the map being interrogated, and callback5 is an id assigned by the mapplet to the response. The serialized response to this request may look like:
call backService&callback5&33.5,-27.3
where callbackService is the id for a special service indicating this is a response to a query; callback5 is the id assigned to the callback (so the mapplet javascript knows where to direct the result), and 33.5,-27.3 is the latitude and longitude of the center of the map (the response, passed to the callback).

The register service call registers a new service and associates it with a particular handler. Subsequent calls to the frame that is assigned as the handler may then use the service. Calls to register a service may include an ID for the service (to be used by iframes that later seek to use the service) and a service handler. For example, in a service allowing mapplets to query a map center point, the map may register a service with the communication system, which could include the service id (4 above) and a service handler. The service handler would look like
GMap.prototype.getCenter( ){return this.center;}
This service would return the center of the map to the caller. When a call is made to the map, the service id is used to determine which service handler to call. This service handler is called, and the result (in this case the current center of the map) is returned through the communication system to the caller.

The initialize call initializes an inter-domain client by informing the client of the ID of the calling frame (as seen from the parent frame). Such a call may include a parameter identifying a source frame ID. Once informed of the ID for a particular frame, the system may provide for the routing of information to the frame.

Consider a message sent from iframe 'A' (the iframe with name/id 'A') to iframe 'B' (the iframe with name/id 'B'). First, iframe A contacts the router for its domain, providing the message to send, the iframe of the target id, and a callback handler (function) if a response is expected. Next, the router for the source iframe A needs to contact the router for the target iframe B. In order for it to know which router to contact, it should have already been given a mapping from iframe id to router domain. This is provided in the initialize call. When the main page creates a new mapplet iframe (or any iframe which will use the communication system) it also provides that iframe id and its domain to each other router. This allows foreign iframes to contact this new mapplet iframe, knowing only the name/id of that iframe.

The router library generally provides for packetizing and maintaining a pool of iframes that may be used for communication, so as to avoid having to create and destroy many iframes. A class associated with the pool keeps track of the current state of each iframe associated with the particular router, including by marking an iframe as locked when it is created or when its src is set to a particular packet. When the iframe is loaded, the pool class assumes that the packet has been delivered and marks the iframe as unlocked (or free for reuse). Where different mapplets relate to different domains, a router may be created for each domain and associated with the mapplets for that domain.

One example of the use of such communication structures and techniques with a mapping application may include a transmission from a mapplet such as module A 312 to populate a map in the maps application 324 with markers associated with "hot" fishing spots identified on a fishing-related web page. The mapplet may initially be loaded and then may be manipulated by a user to, for example, identify a certain type of fish, such as large mouth bass. The user may then choose to submit the selection, which may cause the mapplet code to access data server 310, which may be a server storing local fishing reports that include lake names and types, numbers, and sizes of fish caught on the lakes over the most recent weekend.

The mapplet, in module A 312, may contact such a data server 310 in a number of ways. Firstly, it may directly make requests of such the server 310 using cross-domain communication techniques (such as a cross-site scripting request). Secondly, it may make use of a proxy server, such as the Google proxy server provided by iGoogle as part of the Google Gadgets API. Thirdly, in some instances (such as when using a maps geocoding API) it may request that the containing page (the maps application) make a request to a service (such as a Google service) on its behalf.

The data server 310 may then return a listing of all such lakes, along with information about large mouth bass caught in each lake. Upon receipt of the information, the maps application 324 may cause the information to be forwarded to the maps server 308, which may analyze the location-related information in the form of lake names, and attempt to convert that information into lat/long pairs or other specific location data. The server 308 may then return the information relating to locations of the lakes to the client device 302. In the first method above, the mapplet directly receives the data from the server. In the second method above, the request and response go through a service such as the http://gmodules.com/ig/ proxy service provided by Google as part of the Google Gadgets API; a proxy server such as the Google proxy server forwards the request to the remote server, which responds to the Google proxy server, which forwards the response to the mapplet. In the third method above, the host page (the maps application) makes the request of the remote server, receives the response from the remote server, then sends this response to the mapplet through the inter-domain communication system.

Module A 312 may then generate commands for making markers for each lake and placing the markers at each identified lake. Where, for example, ten lakes were returned by the data server 310, twenty commands may be generated and may be provided to module router 318. The packetizer may merge all of these packets together into a larger packet and may wait a period of time associated with an assumed latency that is acceptable in the system for delivery of packets. Once the time period is reached, the module router 318 sends the packets across the domain to the maps router 322, whose packetizer then takes apart the inner packets (which are data groups sent by a particular module), and supplies them to the maps application 324 for execution so that markers are located properly on the map. Other objects may also be added to the map in a similar manner.

As part of the process, the maps application 324 may also cause ads to be placed on or around the map. For example, using location information generated by the maps server 308 and other information in the request to the data server 310 (e.g., "large mouth bass"), the ads server may query for ads relevant to the particular location and to the other gathered information. As a result, ads server 306 may return one or more ads that are not location-specific and that may be displayed, upon receipt, by the maps application, such as in an area dedicated to ads displayed above a displayed map. Ads server 306 may also return one or more location-specific ads, which may cause maps application 324 to generate a marker and other detailed information on the map for an advertiser.

These particular described techniques for communication, such as in inter-domain communication, are provided for illustrative purposes. Other appropriate techniques may also be used. In certain implementations, the described techniques may permit an efficient and convenient mechanism to permit objects from different domains to communicate with each other, but to do so in a manner that is adequately defined and protected from dishonest parties.

Figure 4A:
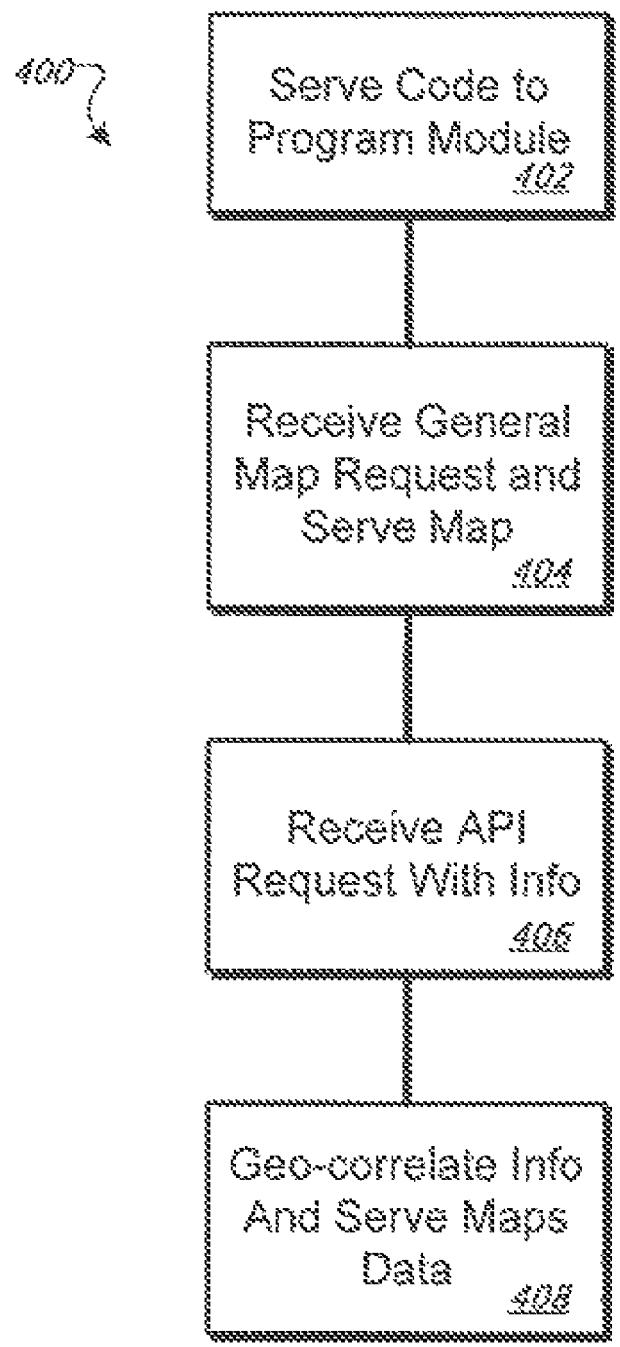
FIGS. 4A and 4B are flow charts of processes for operating mapping-based portable program modules.
Figure 4B:
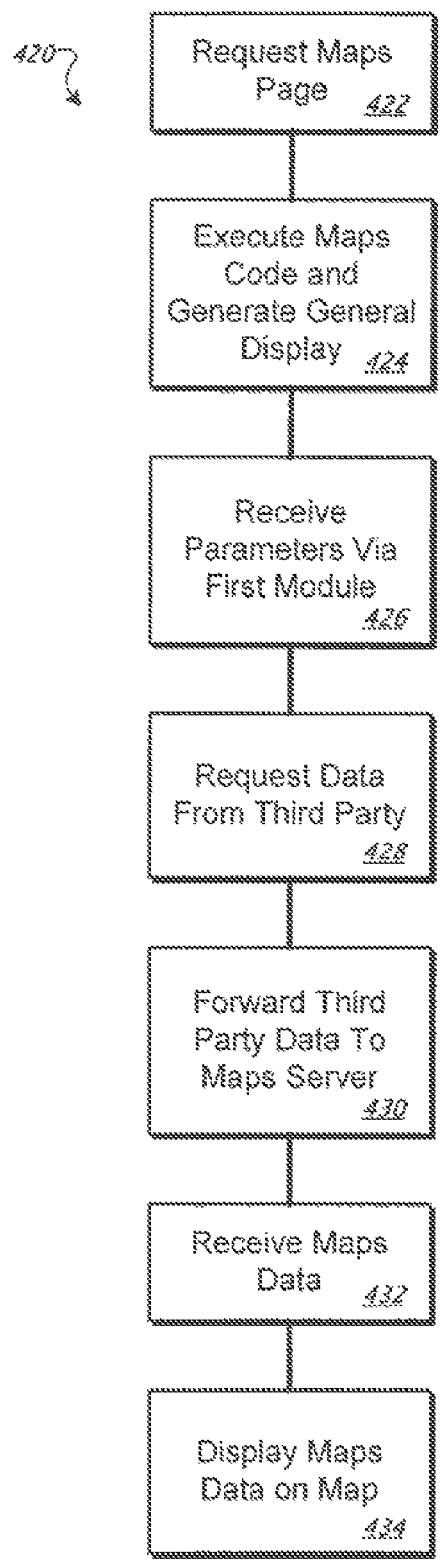

FIGS. 4A and 4B are flow charts of processes for operating mapping-based portable program modules. FIG. 4A generally shows operations that may be performed by one or more servers interacting with a maps application. At box 402, the servers may initially receive a GET command directed to a particular URL, and may provide mark up code associated with the URL, including code for forming one or more iframes for mapplets, and for operating mapplets in the iframes. The requested code may initially be code for a main page, such as from a first domain, which may include code for generating iframes which call for code form another domain. As the code is executed, it may use its default parameters to request maps data associated with the default parameters, such as showing a wide view of a map centered around a user's default or home location.

After some time, a user may have provided new parameters to a mapplet and may have requested that the new parameters be submitted by the client. Such a request may cause a message to be sent to a third-party server (not shown), such as a server that tracks prices of rental properties in a geographic area. A response from the third-party server may be processed by and/or routed by the client device to the maps server in a format compatible with an API for the maps server (box 406). The maps server may then geo-correlate the received information, such as by converting received addresses to lat/long coordinates, and may serve maps data relating to the request. For example, the maps server may transmit tiles for a map at an appropriate zoom level in an appropriate area, and may also return lat/long information for objects to be displayed over the map.

FIG. 4B shows a process 420 similar to the process in FIG. 4A, but from the viewpoint of the client device. At box 422, the client device initially requests a maps page, such as by a user selecting a url for maps.google.com, by a search engine returning a result that points to the map (and selecting the result), or by other appropriate mechanisms. The maps server will then transmit code in response to the request, and may additionally affect the manner in which the code is delivered if it determines that the requester of the code is a registered user of the service (e.g., by adding mapplets to the code that are personalized to the particular user). At box 424, the client device has received the code and may execute it to generate a general display, such as a display showing a map of the U.S., and one or more mapplets with minimal information provided in the mapplets. The code for the mapplets, when they are implemented, for example, in iframes, may cause additional information or code to be retrieved to the page from other servers.

At box 426, a user provides parameters for one of the mapplets, such as by selecting values from drop down lists or by entering particular values for empty fields. When the user chooses to submit the parameters, the client device may request data relating to the mapplet from a third party data provider (e.g., Craigslist listings). When the third party data is delivered, the client device may then submit it (perhaps after editing and/or reformatting it) to the maps server (box 430) for interpretation to generate geo-correlated data for the results. After the maps server has processed the request, the client device may receive the maps data (box 432) and display the maps data (which may also include new tiles for another area of the map) on the map using a maps application (box 434).

Figure 5A:
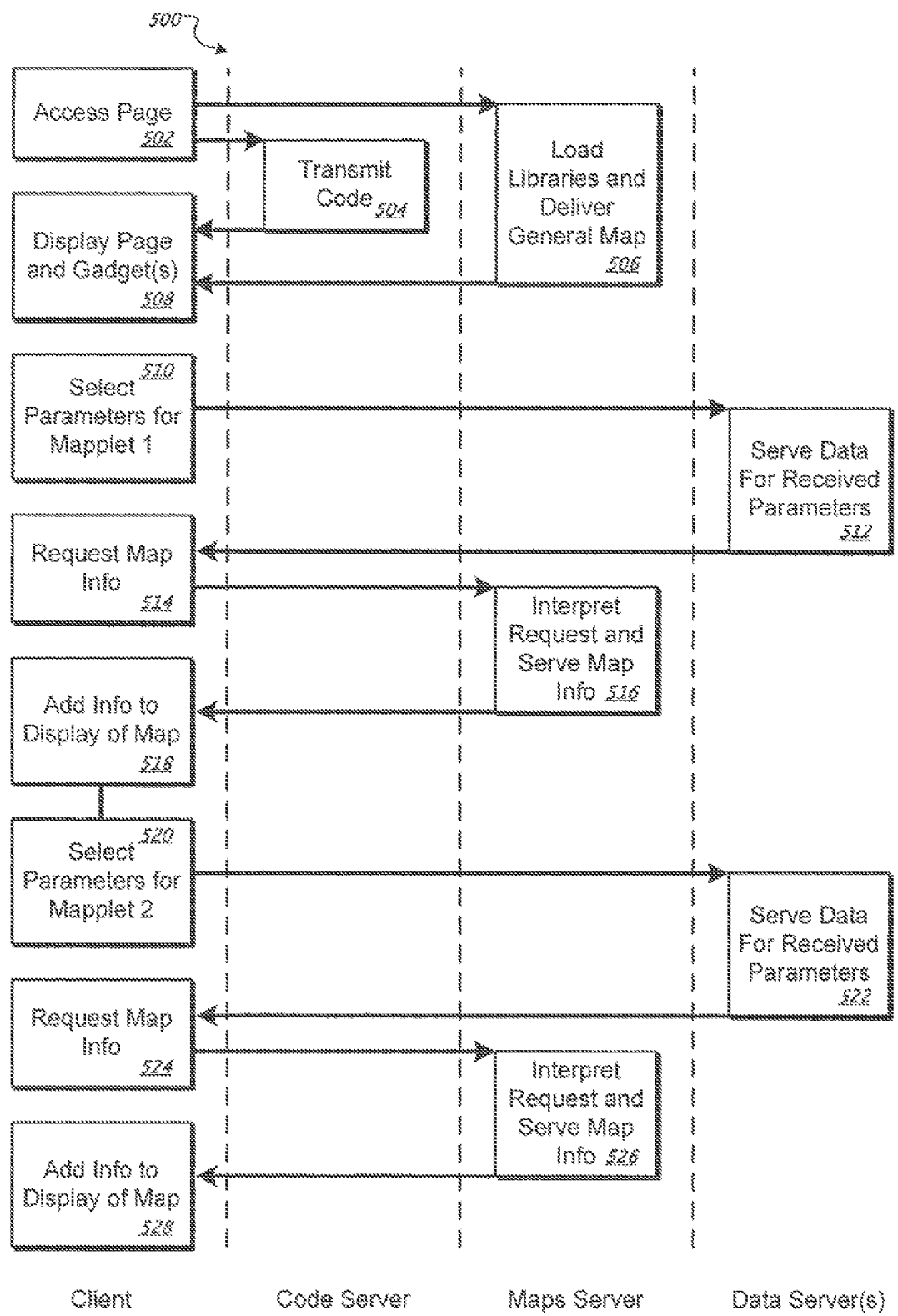
FIGS. 5A and 5B are swim lane diagrams of processes for coordinating operation of portable program modules and a mapping application.
Figure 5B:
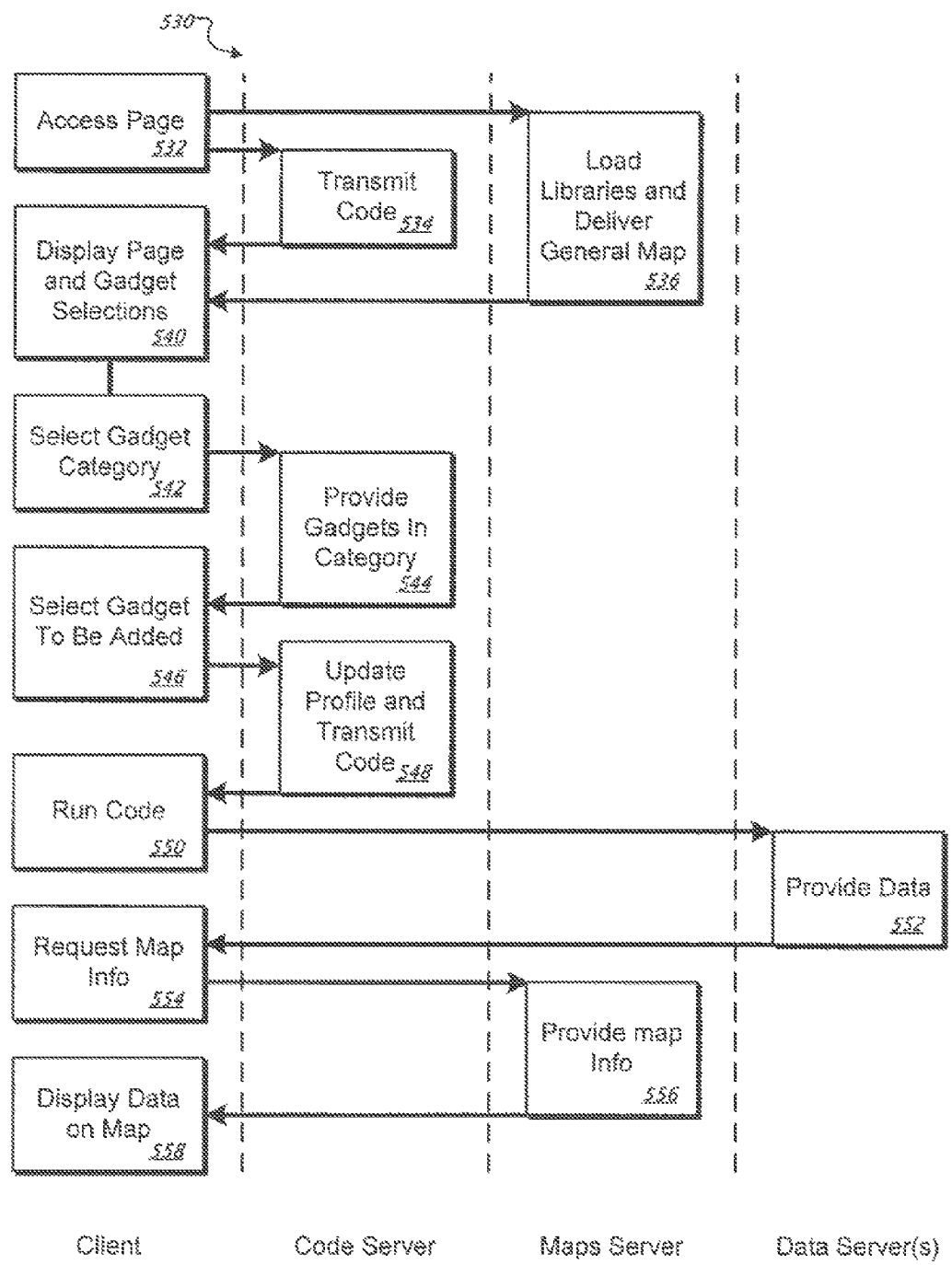

FIGS. 5A and 5B are swim lane diagrams of processes for coordinating operations of portable program modules and a mapping application. In general, the process 500 shown in FIG. 5A shows a simple process of providing maps data in response to submissions from a user to two different mapplets associated with a particular map application, while the process 530 shown in FIG. 5B shows the selection and addition of a mapplet to a user's personalized page.

Referring to FIG. 5A, at box 502, a user initially accesses a map-related page, and a server that includes mark up code transmits the code (box 504), while a server containing particular maps data delivers that data (box 506), which may include maps-related libraries and a general map for initial display in the application. The provision of code and maps information may also be generated by a single server. The general information provided by the code server and/or maps server may include a list of possible mapplets to be used by a user.

In certain situations, the identified mapplets may be context-dependent. For example, the provision of the maps application may have occurred in response to a search request, and analysis of terms in the search request may indicate that a certain type of functionality is desired with respect to the map, so that mapplets addressing that functionality are displayed with the general map. The mapplets may thus be provided with the map in such a situation. Also, in such a situation, the map may be positioned in a manner relevant to the search request (e.g., around a zip code in the request) and/or default values for the mapplets may be selected based on the search request. Alternatively, a user database may be consulted to determine mapplets that have previously been selected by a particular user, and may be displayed again, as part of a personalized maps page.

At box 510, the user selects particular parameters for a first gadget and submits them to a data server, which then returns data that may be relevant to the submitted request (box 512). The returned information may include information, such as addresses, that are indicative of locations. Upon receiving the data, the client may request map information associated with the data (box 514), and the maps server may interpret the request and serve the map information (box 516). Upon receiving the information from the maps server, the client may add a representation of the information to the map in the maps application (box 518).

After some time, the user may then choose to provide parameters to another mapplet to, in effect, create a mash-up of mash-ups (box 520). A similar process may occur as occurred for the first mapplet, with the request for and service of data (box 522), the subsequent requesting of map information associated with the served data (box 524), the provision of map information from the maps server (box 526), and the display of the information provided by the maps server (box 528). Such display may occur along with the prior display from the interaction with the first mapplet. As a result, a user may be able to select two particular mapplet applications and to generate a display that combines information from both of the mapplet applications.

Referring to FIG. 5B, which generally shows selection by a user of a mapplet to be displayed with a map page, and subsequent use of the mapplet, the user (through the client) initially accesses a maps page (box 532) and may receive code and general maps information (boxes 534, 536). In this instance, however, no mapplets or gadgets have previously been selected. Instead, the user is provided with a display of a number of available mapplets (box 540), which may be implemented like gadget selection in the Google Personalized Home Page or iGoogle. The mapplets may be arranged in categories, and a user may select one of the categories (box 542), and then further be provided with controls for selecting particular gadgets that are in the selected category (box 544).

The user may then select a particular mapplet or gadget (box 546), which may cause a code server to update the user's profile to indicate that the selected mapplet should be loaded in the future when the user accesses the system (box 548). The server may also transmit the code for the mapplet, so that the mapplet is displayed on the maps page in a newly created iframe. With the mapplet code delivered, it may then be run (box 550) so as to request data from a data server (box 552), use the received data to request map information (box 554) from a maps server (box 556), and display the data on the map (box 558).

Figure 6:
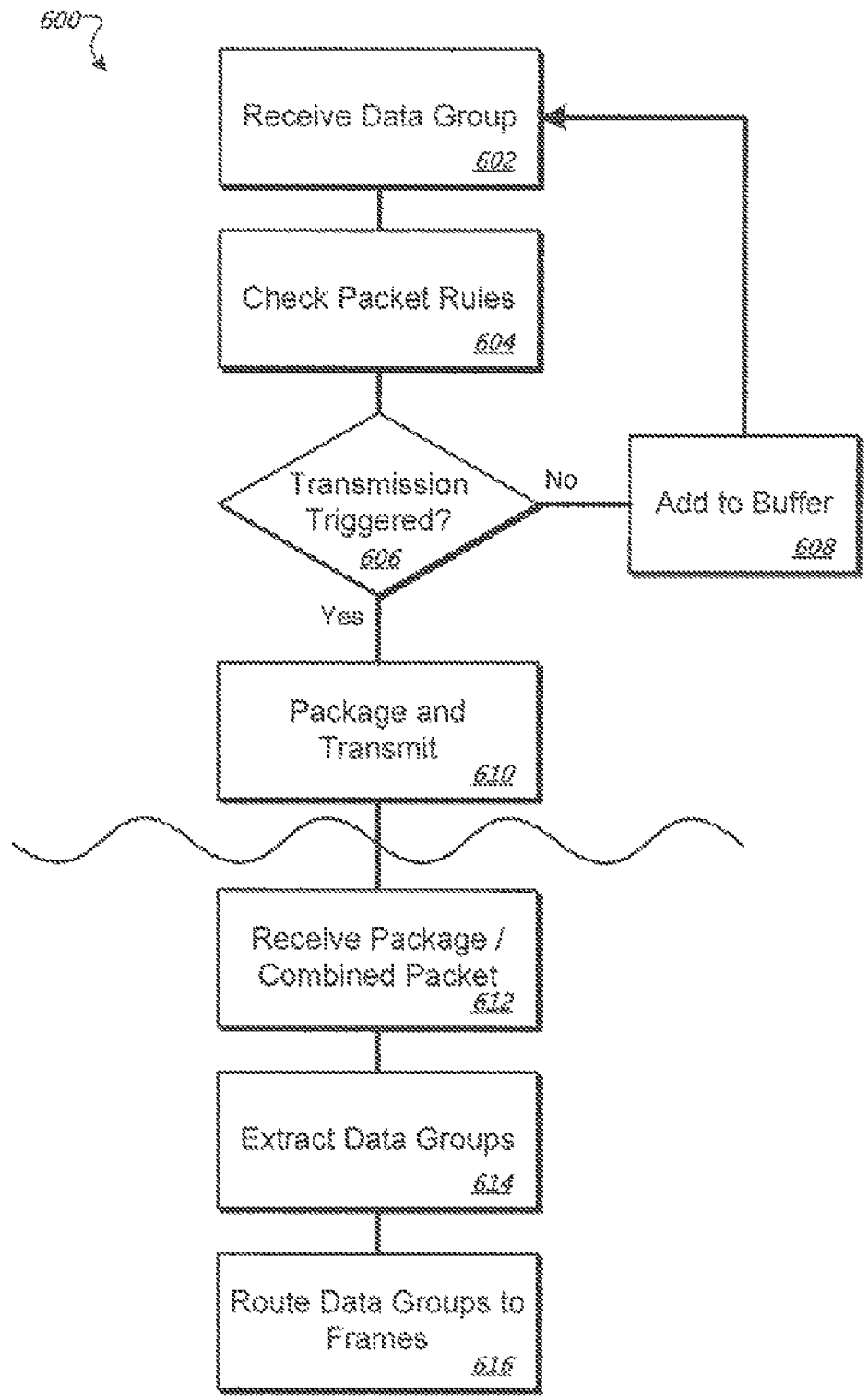
FIG. 6 is a flow chart of a process for coordinating communications between domains displayed by a web browser.

FIG. 6 is a flow chart of a process for coordinating communications between domains displayed by a web browser. In general, this process and others like it may be executed by the components shown in FIG. 3. FIG. 6 generally shows the transfer of a number of packetized packets over a domain boundary. Initially, a data group (which may be a packet or other particular group of data transmitted by a page) is received at a relay or router. The router may receive the data group or data groups, and may check its packetizing rules to determine an order for packetizing the received groups, and also to determine whether further holding of the packets is warranted (i.e., to build a bigger and more efficient combined packet for transmission). If transmission of the combined packet is not triggered by the rules (box 606), the received data group is added to the packet buffer (box 608), and if transmission is triggered, then the router packages and transmits the data group and other data groups that it is holding (box 610).

The transmission crosses the domain boundary, and at box 612, the corresponding router receives the combined packet. That router may then, according to predetermined rules, disassemble the combined packet to extract the sent data groups from the packet (box 614). Finally, the receiving router may route the individual data groups to the frames in that particular domain (box 616).

Figure 7:
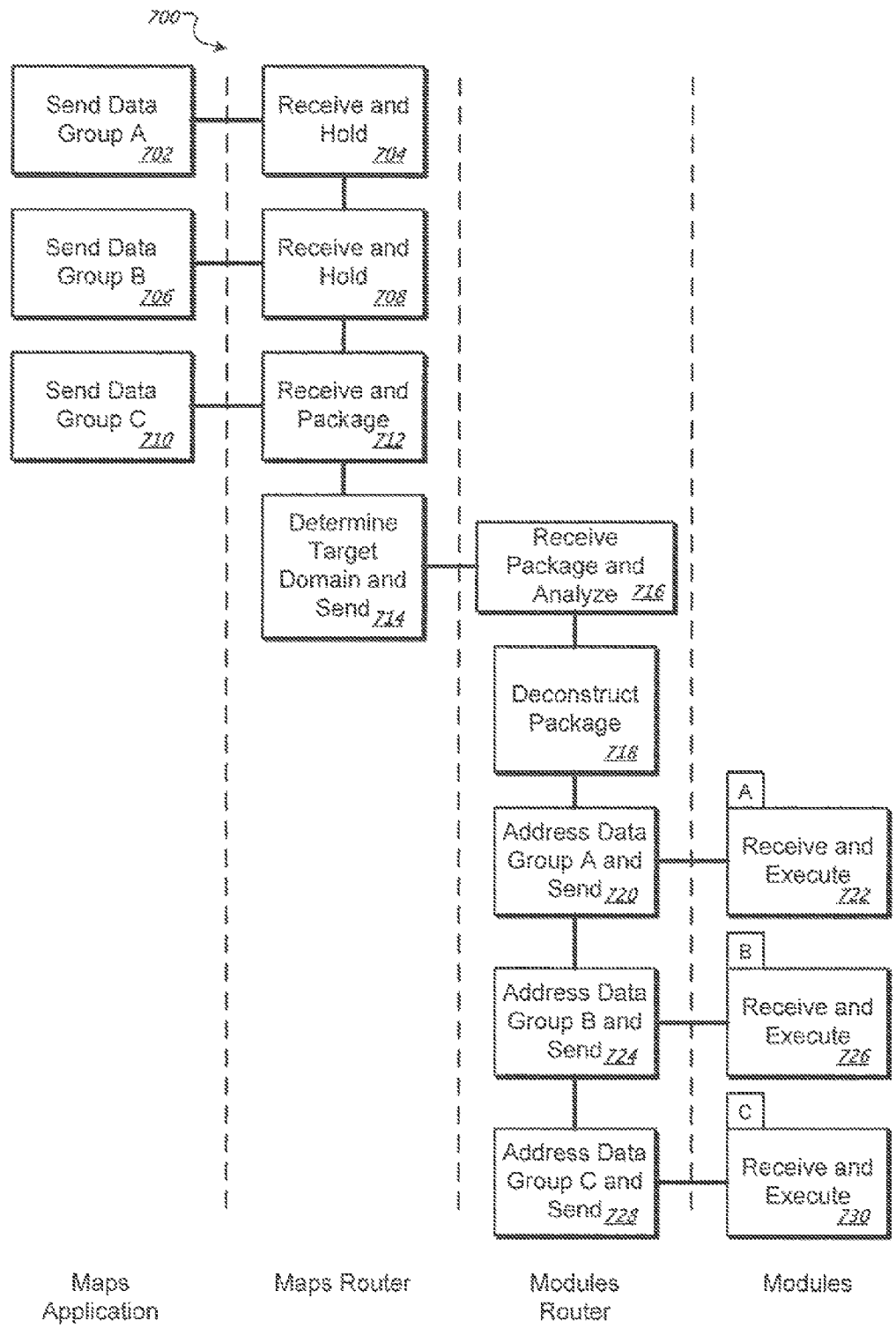
FIG. 7 is a swim lane diagram of a process for sending data between domains on a browser-displayed web page.

FIG. 7 is a swim lane diagram of a process for sending data between domains on a browser-displayed web page. At boxes 702-712, three different data groups are received from a maps application associated with a particular domain on the page. For example, a user may have moved a map or otherwise affected the map in way that are relevant to three different mapplets associated with the map, and the maps applications may be reporting out such action. The maps router holds the first two data groups, and upon receiving the third, determines that latency or size of a combined packet requires transmission of combined packet across the domain boundary. At box 714, the router determines the target domain, and sends the packet to that domain.

The modules router, which is a router associated with a domain in which several portable program modules in the form of mapplets exist, receives the combined package (box 716), and deconstructs the package to extract the data groups that were placed in it (box 718). Upon extracting the data groups from the combined package, the modules router may determine the address of each data group and route that group accordingly to the appropriate mapplet (boxes 720, 724, 728), where there are multiple mapplets associated with a maps application on a page. The data may then execute in each mapplet (boxes 722, 726, 730).

Figure 8:
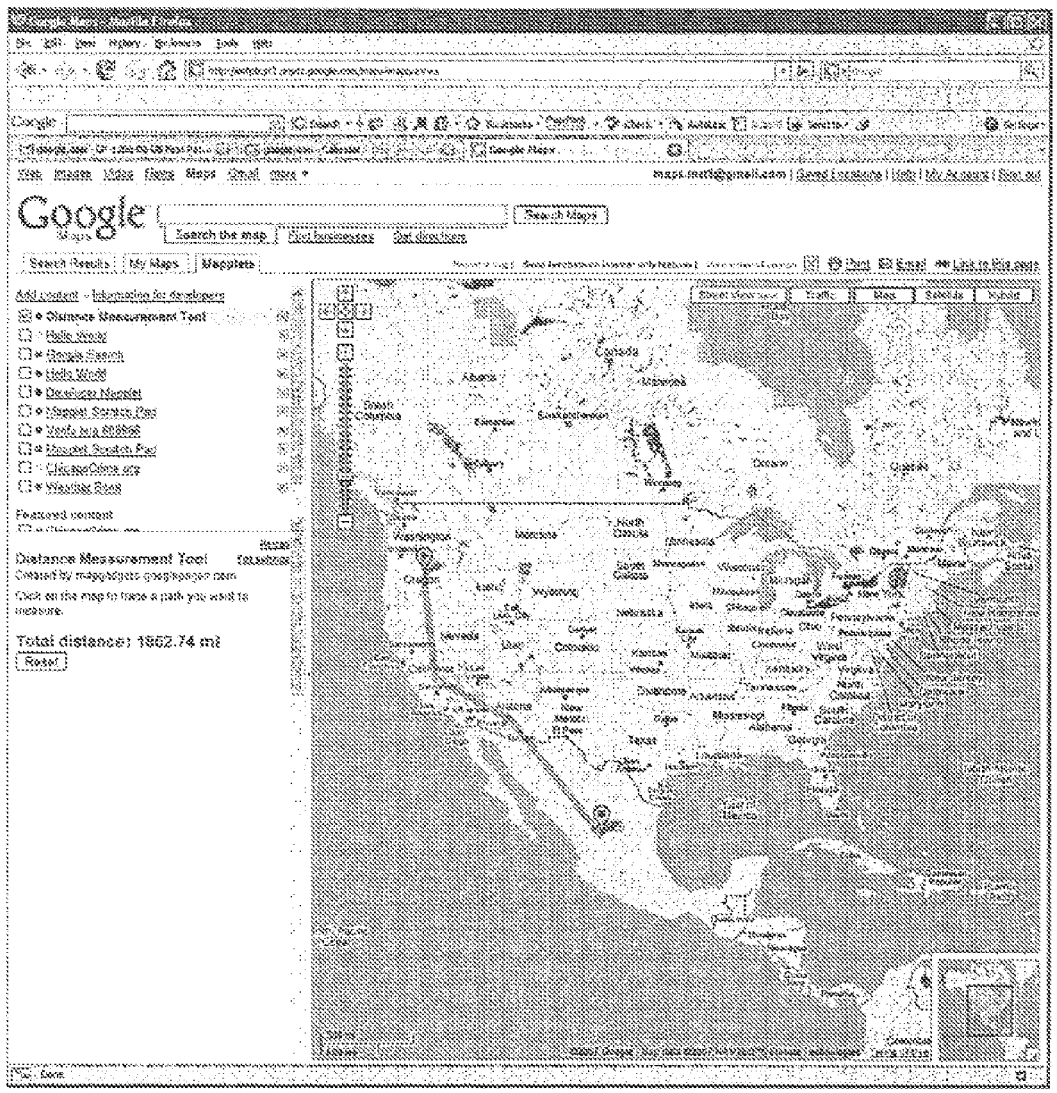
FIG. 8 is a screen shot showing an example of a maps application operating in coordination with two portable program modules.

FIG. 8 is a screen shot showing an example of a maps application operating in coordination with two portable program modules. The first module provides a user with an opportunity to select additional modules to be added to the display. For example, a server associated with the modules may store code for modules relating to mapping of crime in Chicago, weather applied to a map (e.g., temps and sun/rain/snow conditions), and other various modules. Check Box controls are provided for a user to select modules they would like to add to their page (and the page can be saved as a personalized maps page). In addition, colored dots may be shown next to each selection to indicate a value for the selection, such as a mapplet type or subgroup into which the mapplet falls (e.g., measurement tools, social tools, business tools, map creation tools, etc.).

A distance measurement tool module has been previously selected by a user and is displayed in an expanded form. The distance measurement tool interacts with the main maps application to permit a user to select two or more points on a map (or to identify two or more locations, such as by state, town, and street address), and then to compute the distances connecting the points and to display the distance to a user.

Others of the modules, if selected, may combine their output with the distance measurement tool. For example, if the user selects a Chicago crime module, the map may be transformed to zoom in on Chicago, and to show indicators for areas in which crime has occurred in Chicago. The user may then use the distance measurement tool to determine the distance between crime sites or other information. In this manner, the displayed applications may permit a user to mash together multiple applications in a way that is customized for them, and that directly accesses a mapping service such as Google Maps.

Figure 9:
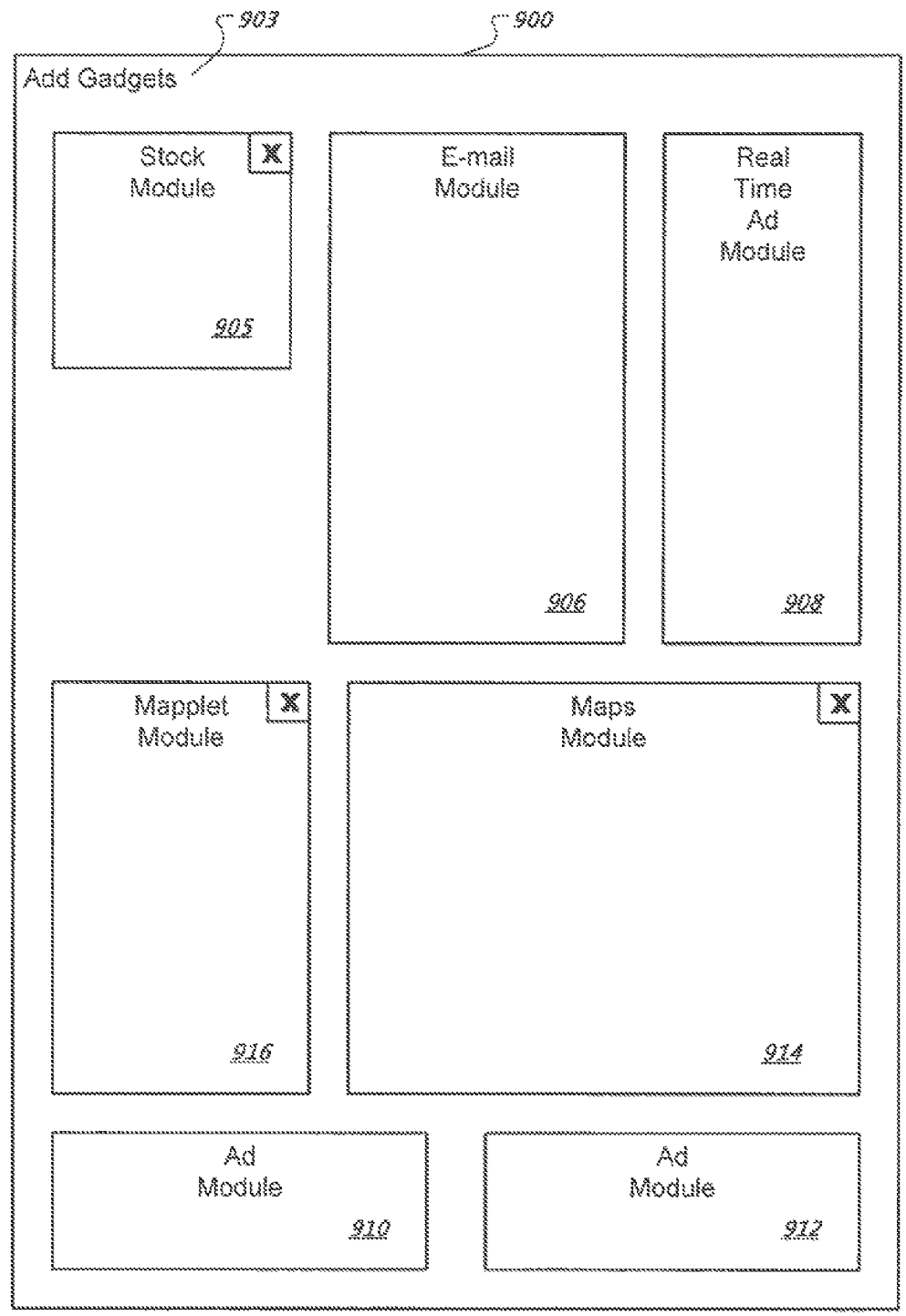
FIG. 9 shows an example layout of a container document that includes a number of portable program modules and a mapping application.

FIG. 9 shows an example layout of a container document 900 that includes a number of portable program modules. A number of methods of incorporation are possible, including the use of iframe and inline HTML techniques. FIG. 9 depicts a plurality of modules including a stock module 905, an e-mail module 906, a real-time ad module 908, ad modules 910, 912, mapplet module 916, and a maps module 914. Different formats for the various modules may exist depending upon the specifications provided by the creator of the module. Some modules may provide scroll bars, and others may not. Some modules may be different sizes or shapes than other modules. In addition, some modules may offer an opportunity for the user to edit the display preferences and/or per-use data associated with the module.

In one implementation, inlined modules may be automatically sized by a container document so no scrolling, height, or scaling information may be provided. If a module developer wants the module to have those properties, an inlined module may be wrapped with a fixed size <DIV> tag and content placed in the tag. The scroll bar, height, and other characteristics may be then specified for the inlined content. One of the attributes allows specifying scaling=" . . . " to let the developer indicate how a module may be scaled up or down for different sizes of placements in the container documents.

One of the functions provided with this example container document 900 is the opportunity to add content to the container page through selecting the add gadgets element 903. Upon selecting the "add gadgets" element 903, the system may offer the user the opportunity to interactively indicate an additional element to be included in the container page. Various forms of an interface to receive that input may be provided.

In addition, in adding, editing, or deleting modules, it may be desired to have those activities occur without a refresh of the container document. One illustrative technique for achieving this may involve use of AJAX programming techniques so a module may be added to a container document without a refresh of the container document page (perhaps only a refresh of the iframe in which the new container is presented), or use of AJAX to remove a module without the container document being refreshed, or when a developer is developing a module, being able to change modules without the container document in which they are populated having to have a page refresh in order to incorporate the changed module.

With reference to particular modules, the mapplet module 916 may be displayed in an iframe that references code for a portable program module, like those discussed above. The mapplet module 916 may interact with other modules such as the maps module 914, which may be associated with a domain for a maps server, such as maps.google.com, and which may be configured to received and display tiles for maps, to display objects provided by mapplet module 916, and to provide feedback to mapplet module 916.

Other modules may also communicate in the system. For example, e-mail module 906 may also include a calendar feature that has information for appointments for a user. E-mail module 906 may receive a request from mapplets module 916 for time, location, and other information for upcoming appointments for a user, and may return such information to the mapplet module 916. The mapplet module 916 may then forward address information to a maps server to obtain geo-correlated data for the appointments. The mapplet module 916 may then cause objects associated with each appointment to be post on a map displayed by maps module 914. In a like manner, ad modules 910, 912 may receive geographic information from, for example, mapplet module 916 or maps module 914, and may retrieve targeted ads directed to particular optics and/or locations in the information.

Figure 10:
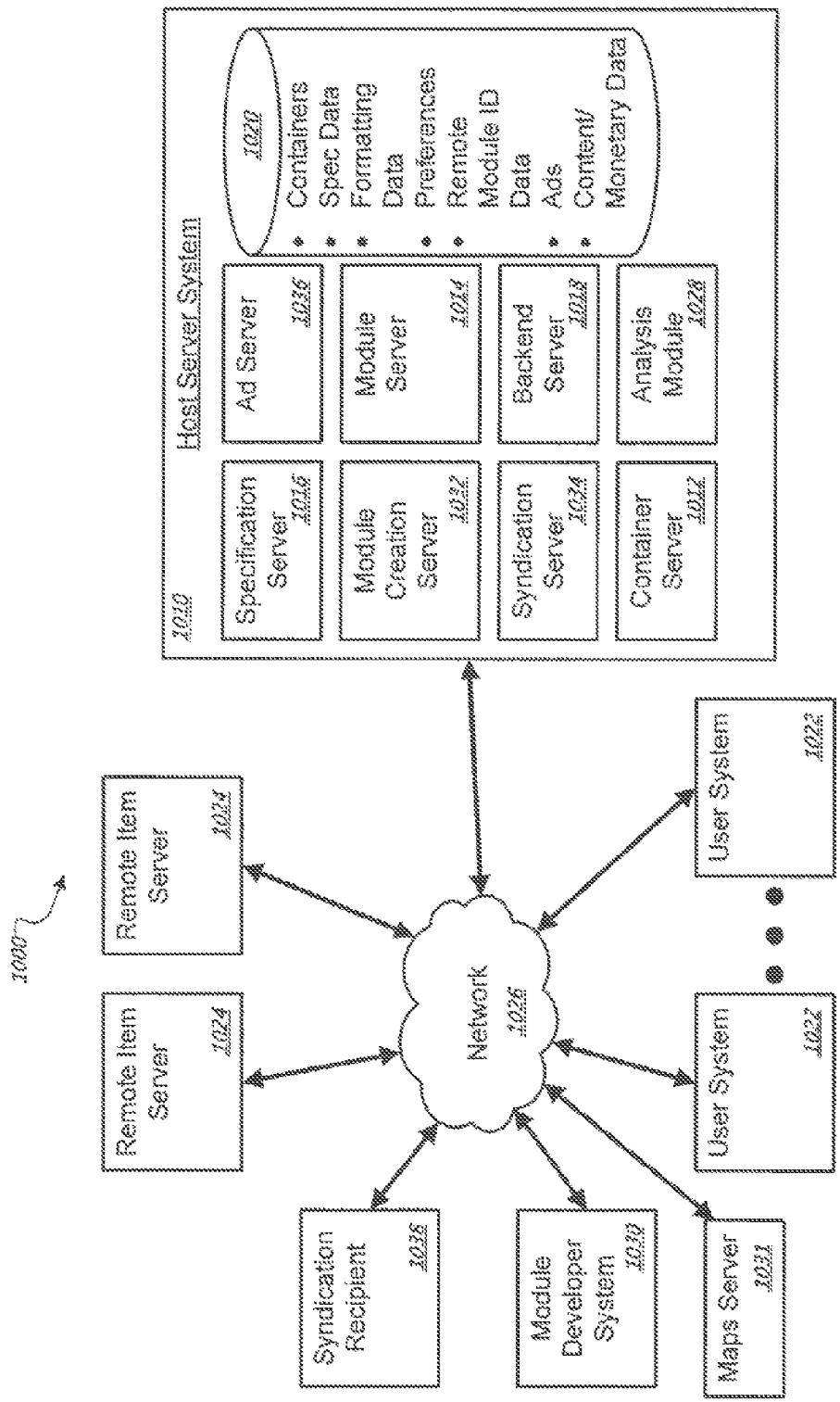
FIG. 10 is a schematic diagram of an example system for dynamically generating maps, advertisements, and other items.

FIG. 10 is a schematic diagram of an example system 1000 for dynamically generating advertisements and other items. The system 1000 is a general representation of a system that employs portable program modules, such as gadgets, for various operations. The general operations described here are, when appropriate, applicable to the systems shown in FIGS. 1A, 1B, 2, and 3.

System 1000 may include a host server system 1010 with a plurality of modules that may be associated therewith. Such modules may comprise a container server 1012, a module server 1014, a specification server 1016, a back end server 1018, an analysis module 1028, a module creation server 1032, a syndication server 1034, and an advertisement server 1036. As illustrated, host server system 1010 may connect over a network 1026 to a plurality of other systems or subsystems.

Other systems connected to the network may comprise one or more user systems 1022, one or more remote item servers 1024, one or more module developer systems 1030 and one or more syndication recipient servers 1038. In addition, one or more database systems 1020 may operate in conjunction with the various modules of host server system 1010.

In particular, one separate server may be a maps server 1031, which may serve geographic data in response to requests that match a particular API. The maps server may alternatively be part of the host server system 1010, but is shown separately here for purposes of illustrating that applications using the system 1000 may communicate across multiple systems. The maps server may, for example, receive requests from user systems 1022 running code provided by components in host server system 1010, such as to generate mapplets or other portable program modules.

Referring again to components of host server system 1010, container server 1012 may serve container documents to user systems 1022 over network 1026. Container server 1012 may use a web server or related server systems that take data and/or instructions and formulate containers for transmission over the network to the user system 1022. However, that container server 1012 may reside on user system 1022 as well, so that a network connection may not be used. In the example in which the container document includes a word processing document, for example, container server 1012 may comprise a word processing module.

Module server 1014 may provide data from modules to container server 1012 for incorporation into a container document. In one embodiment, container server 1012 and module server 1014 may comprise a single unit performing both functions, as may other servers and modules described herein. Module server 1014 may provide data for the container document by interpreting and/or parsing instructions in a module specification associated with the module. According to one embodiment, module server 1014 may serve the module content to the container document through the use of a browser iframe.

To expedite display of container documents, modules may be displayed inline within the container document. Inline display may be understood as referring to display with other document elements. One example is a display generated from code for HTML in the body according to HTML standards. In one embodiment, module server 1014 or some other component may determine whether the module is deemed trusted before including it in the container document due to the risks of various security issues an inline module could create. According to one implementation, the module may incorporate an indicium of approval (e.g., digital certificate) issued by the container module or an entity associated with the container module. If the indicium of approval is present, module server 1014 may render the data from a module for inline presentation in the container document.

Specification server 1016 provides a module specification file to module server 1014. The module specification may be cached and stored in a database accessible to the module server 1014 and/or specification server 1016 or may be retrieved from a location associated with the specification as detailed later. For example, specification server 1016 may reside on a remote item server 1024. In addition, specification server 1016 may be connected to module server 1014 over a network with the module specification located at another location on the network accessible to specification server 1016.

Backend server 1018 may be provided for interacting with one or more databases (e.g., large or dynamic databases of information). For example, for a news module that obtains frequent updates and demands a flow of data, (e.g, from an RSS feed), backend server 1018 may format the data into HTML for the container.

In one specific example, a person may create a module (e.g., a maps module), such as one that uses an application program interface (API) to an existing mapping program to create a module to display a map of downtown Mountain View, Calif. The module may include an XML specification file or module specification file stored on a specification server. The specification server may comprise any appropriate server, including one on a site from which the container page is hosted. The user or another person may then include this new module on a personalized homepage or another form of web page (container document). The server that serves the container document may operate as the module server, and the server that generates the mapping data through an inquiry from its API may be considered to be the backend server.

In one implementation, analysis module 1028 may analyze modules at various times (e.g., when the module is first selected by a user, each time the module is called by a container for inclusion or at any other time determined to be advantageous for safety and security and other times). Analysis module 1028 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module.

Analysis module 1028 may take one or more actions in response to a determination that the module is disapproved or dangerous, including, for example, silently blocking the request (i.e. providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module).

For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 128 may parse the module content to determine whether it is safe, such as by compiling JavaScript or other scripts contained in the module to try to identify unsafe or undesired actions the module may perform.

One or more module creation servers 1032 may be provided. These servers may operate as "wizards" to enable module creators to create a module through an interactive process. For example, module creation server 1032 may provide a series of user interfaces that enable a person creating a module to provide inputs that are used to automatically generate a module specification. For example, various module specification templates may be provided with corresponding inputs. Module creation server 1032 may then take inputs supplied by a user, insert them into a template, and generate a module specification for the module. A preview, testing, and debugging function may also be offered as part of the "wizards." This module may be downloadable to a client as well.

A syndication server 1034 may prepare data for transmission to one or more syndication recipient servers 1038 related to modules. Syndication server 1034 may receive a request for a module and/or module content and deliver that module or content to a syndication recipient server 1038 over network 1026. Syndication server 1034 may reside at host server system 1010 or at another location on the network.

For example, if an operator of a sports web site (an example of a syndication recipient system 1038) desires to include an advertising module created by a remote source system 1024, it may do so through a request to syndication server 1034. Syndication server 1034 may then cooperate with module server 1014 to generate data for the container document (here the sports web site page of the syndication recipient system 1038). That may involve retrieving the module specification from remote source system 1024, supplying preferences received from the syndication recipient server 1038 (e.g., city information for the sports team of a page being displayed) and/or generating data for the container. It is also possible that the data may be rendered at syndication recipient server 1038 into its container document in either an iframe or inline. Syndication server 1034 may thus syndicate modules accessible to it. It may do so based on requests for specific modules or other criteria it determines (e.g., content matches, keyword matches, monetary values associated with modules and/or syndication requestors, etc.).

Ad server 1036 may provide advertisements associated with modules to containers and/or data for creating a display for such modules. For example, an advertisement may be incorporated with module data when data is delivered to a container document. Ad server 1036 may operate with syndication server 1034 to deliver advertisements to syndication recipient servers 1038 based on a syndication request for a module. The advertisements may be selected by ad server 1036 based on a wide variety of criteria, including, but not limited to, the relationship between the content of or information about the container, module, other modules in the container, syndication recipient server information, monetary elements/relationships related to any of the foregoing and/or combinations thereof.

Ad server 1036 may comprise the Google AdSense system, according to one implementation. Specifically, ad server 1036 may manage online advertising by associating two or more concepts related to a module with an advertisement and associating a bid, collectively, with the two or more keywords. In addition, syndication server 1034 or ad server 1036 may respond to requests from syndicated modules such as advertising-related modules that send requests for information describing container pages associated with the modules.

One or more database systems 1020 may be provided that store, in any number of appropriate manners, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, the data may be stored at a number of locations and in one or more systems.

In one implementation, systems and method are provided to incorporate modules into a container document. One example of a container document would be a personalized home page, such as the Google Personalized Homepage, or iGoogle, currently available to users of the Google services on the Internet. Instead of restricting the types of content that a user is able to include in a container document such as a personalized home page, one or more implementations may enable users to select modules from sources other than the source of the container document. So, for example, a user may elect to include a module in his or her personalized Google home page from a source not associated with Google.

Figure 11:
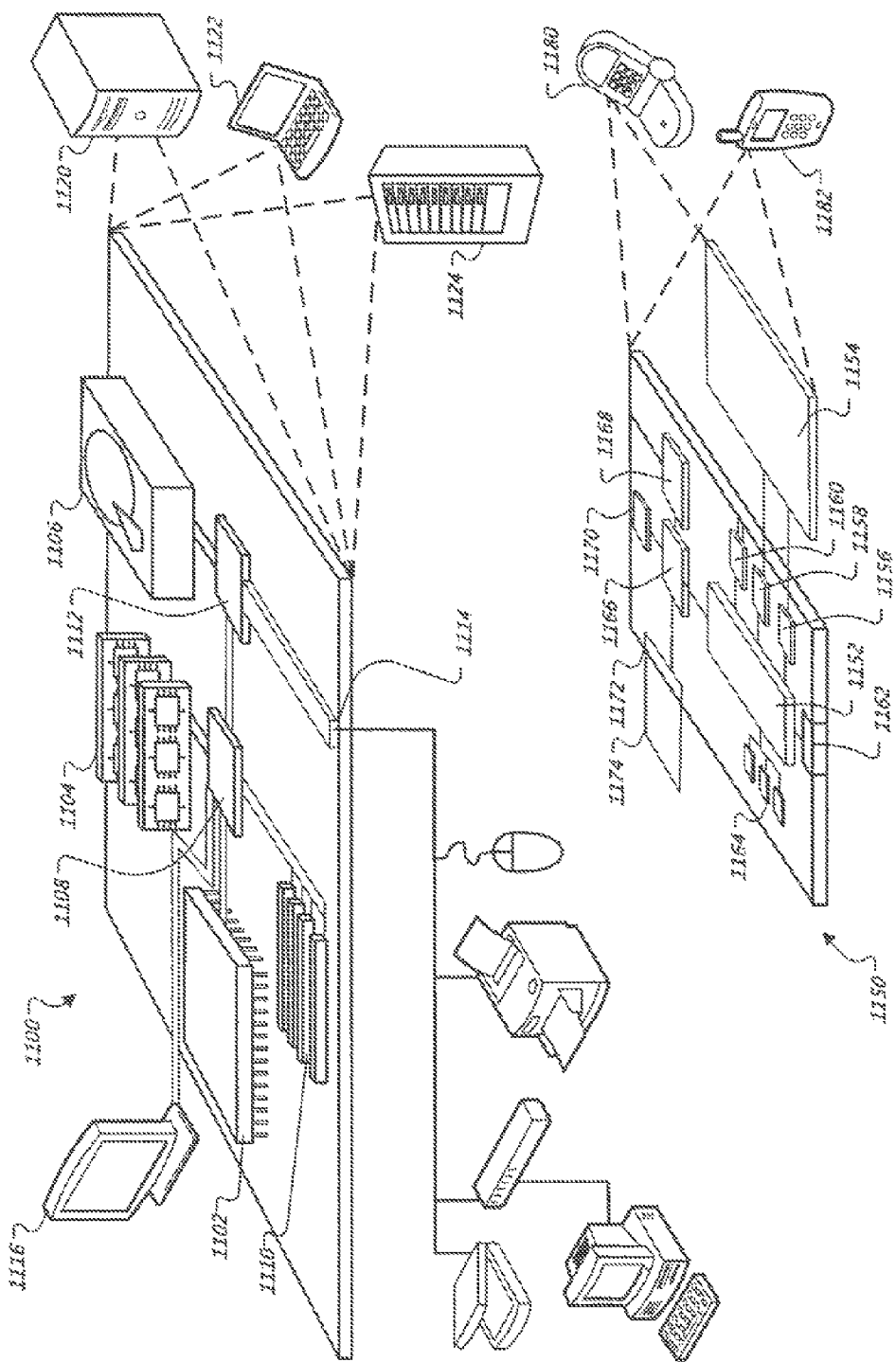
FIG. 11 shows an example of a computer device and a mobile computer device that can be used to implement the techniques described here.

FIG. 11 shows an example of a computer device 1100 and a mobile computer device 1150 that can be used to implement the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, memory on processor 1102, or a propagated signal.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, memory on processor 1152, or a propagated signal that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, container document 102MA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs; software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the content delivery systems and methods have been described, it should be recognized that numerous other applications are contemplated. Moreover, although many of the embodiments have been described in relation to real time, dynamically created advertisements, other content delivery may also be provided in other various forms. Accordingly, other embodiments are within the scope of the following claims.

What is claimed is:
1. An apparatus comprising:
 a computing device including a programmable digital data processor and a display screen, the digital data processor programmed to execute, in a web browser, at least a first application hosted in a first domain, a portable program module hosted in a second domain that differs from the first domain, the portable program module having an input element for receiving user input and programmed to generate remote procedure calls calling procedures of the first application, and an inter-domain communication system providing message communications between the first application and the portable program module using at least the remote procedure calls generated by the portable program module, at least some of the remote procedure calls including information characterizing user input received by the input element of the portable program module.

2. The apparatus of claim 1, wherein the inter-domain communication system provides packetized inter-domain message communications between the first and second domains, at least some of packets including multiple remote procedure calls in a single inter-domain message.

3. The apparatus of claim 1, wherein:
the first application comprises a host object;
the portable program module has a stub proxy for the host object, and
the inter-domain communication system allows the stub proxy to provide information for generating the host object.

4. The apparatus of claim 1, wherein:
the first application comprises a host object;
the portable program module has a stub proxy for the host object, and
the inter-domain communication system allows the stub proxy to track the host object.

5. The apparatus of claim 1, wherein at least some of the remote procedure calls expect a response and include information characterizing the expected response.

6. The apparatus of claim 1, wherein:
the digital data processor is programmed to execute, in the web browser, a second portable program module hosted in a third domain that differs from the first and second domain; and
the inter-domain communication system provides message communications amongst the first application, the portable program module, and the second portable program module.

7. The apparatus of claim 6, wherein the digital data processor is further programmed to create a mapping of the respective domains of the portable program module and the second portable program module.

8. The apparatus of claim 6, wherein:
the first application generates a container document;
the portable program module runs in a first iframe embedded in the container document and hosted in the second domain; and
the second portable program module runs in a second iframe embedded in the container document and hosted in the third domain.

9. The apparatus of claim 1, wherein the remote procedure calls have ephemeral connections.

10. An apparatus comprising:
a computing device including a programmable digital data processor and a display screen, the digital data processor programmed to execute, in a web browser, at least
a first portable program module hosted in a first domain;
a second portable program module hosted in a second domain that differs from the first domain, the second portable program module programmed to generate remote procedure calls calling procedures of the first portable program module, and
an inter-domain communication system providing message communications between the first portable program module and the second portable program module using at least the remote procedure calls generated by the second portable program module, at least some of the remote procedure calls including information identifying the first portable program module.

11. The apparatus of claim 10, wherein the inter-domain communication system provides packetized inter-domain message communications between the first and second portable program modules, at least some of packets including multiple remote procedure calls in a single inter-domain message.

12. The apparatus of claim 10, wherein the digital data processor is also programmed to execute, in the web browser, an application hosted in a third domain, wherein the first and second portable program modules are documents embedded in the application and the inter-domain communication system provides message communications amongst the application, the first portable program module, and the second portable program module.

13. The apparatus of claim 12, wherein the first and second portable program modules are embedded in iframes of the application.

14. The apparatus of claim 12, wherein at least some of the remote procedure calls expect a response and include information characterizing the expected response.

15. The apparatus of claim 10, wherein the digital data processor is further programmed to create a mapping of the respective domains of the first and second portable program modules.

16. The apparatus of claim 10, wherein the remote procedure calls have ephemeral connections.

17. A method implemented by a client system comprising one or more data processors, the method comprising:
requesting data from a remote data server using a data request;
receiving, responsive to the request, application code for generating a first document and a portable program module for generating a second document;
executing the application code in a first domain to display the first document;
executing the portable program module in a second domain to display the second document, the second document including an interactive display element;
receiving user interaction with the interactive display element;
conveying, from the portable program module in the second domain to the application code in the first domain, a procedure call in response to the user interaction, the procedure call including information characterizing user input received by the interactive element displayed in the second document and calling a procedure in the application code.

18. The method of claim 17, wherein requesting the data from the remote data server comprises submitting a search string to a search engine.

19. The method of claim 17, wherein:

the method further comprises identifying a user of the client system to the remote data server; and the portable program module is a module previously configured by the identified user.

20. The method of claim 17, wherein the portable program module comprises code for requesting additional data from a second remote data server using a second service request.

21. The method of claim 20, wherein the method further comprises the portable program module receiving the additional data responsive to the second service request.

22. The method of claim 20, wherein the method further comprises routing the second service request and the additional data responsive to the service request through a proxy service.

23. The method of claim 20, wherein the method further comprises:

receiving, at the application, the additional data responsive to the second service request; and conveying, from the application to the portable program module, the additional data responsive to the second service request.

* * * * *